(12) United States Patent
Kajiyama

(10) Patent No.: US 7,298,413 B2
(45) Date of Patent: Nov. 20, 2007

(54) PHOTOGRAPHING APPARATUS WITH AUTOMATIC FOCUS

(75) Inventor: Takashi Kajiyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 865 days.

(21) Appl. No.: 10/394,267

(22) Filed: Mar. 24, 2003

(65) Prior Publication Data

US 2003/0223740 A1 Dec. 4, 2003

(30) Foreign Application Priority Data

Mar. 22, 2002 (JP) ............................. 2002-080257
Mar. 22, 2002 (JP) ............................. 2002-080881

(51) Int. Cl.
*G03B 13/00* (2006.01)

(52) U.S. Cl. ...................... 348/349; 348/353

(58) Field of Classification Search ........ 348/345–356; 396/77, 79, 123, 133
See application file for complete search history.

(56) References Cited

U.S. PATENT DOCUMENTS

| 5,083,150 | A | * | 1/1992 | Nagasaki et al. ............. 396/49 |
| 5,115,262 | A | * | 5/1992 | Komiya ....................... 396/91 |
| 5,249,058 | A | * | 9/1993 | Murata et al. ............... 348/354 |
| 2002/0012063 | A1 | * | 1/2002 | Kobayashi ................... 348/345 |

FOREIGN PATENT DOCUMENTS

| JP | 5-227465 | 9/1993 |
| JP | 2001-061096 | 6/2001 |
| JP | 2001-272594 | 10/2001 |
| JP | 2001-281529 | 10/2001 |

OTHER PUBLICATIONS

U.S. Appl. No. 10/394,267, filed Mar. 24, 2003, Kajiyama.
U.S. Appl. No. 10/636,712, filed Aug. 8, 2003, Shinohara et al.

* cited by examiner

*Primary Examiner*—Ngoc-Yen Vu
*Assistant Examiner*—Chriss S Yoder, III
(74) *Attorney, Agent, or Firm*—Oblon, Spivak, McClelland, Maier & Neustadt, P.C.

(57) ABSTRACT

A photographing apparatus is provided that comprises a photographing lens capable of moving a focal plane of a subject image, a CCD for receiving the subject image and outputting a signal into which the subject image is photo-electrically transferred, as image output, a motor section for driving the photographing lens, and a CPU for controlling an operation of the motor section. This CPU divides a range for enabling driving of the photographing lens 1 into a minimum number of or more sections which are capable of being interpolated, drives the photographing lens to each divided section in sequence, figures out a focus signal based on a photographing signal obtained from the photographing device at the each driving position, and performs interpolation processing of an evaluation value obtained from the focus signal. Further, by the interpolation processing, the CPU derives a focus position of the photographing lens which position causes the focal plane to coincide with the photographing plane. In addition, the CPU drivingly controls the motor section to drive the photographing lens to the derived focus position. The photographing apparatus with this configuration ensures interpolation accuracy, thus offering an excellent balance of focus-position accuracy in an entire driving range of the photographing lens and time needed for obtaining the focus position.

15 Claims, 22 Drawing Sheets

PREPARATION PROCESSING

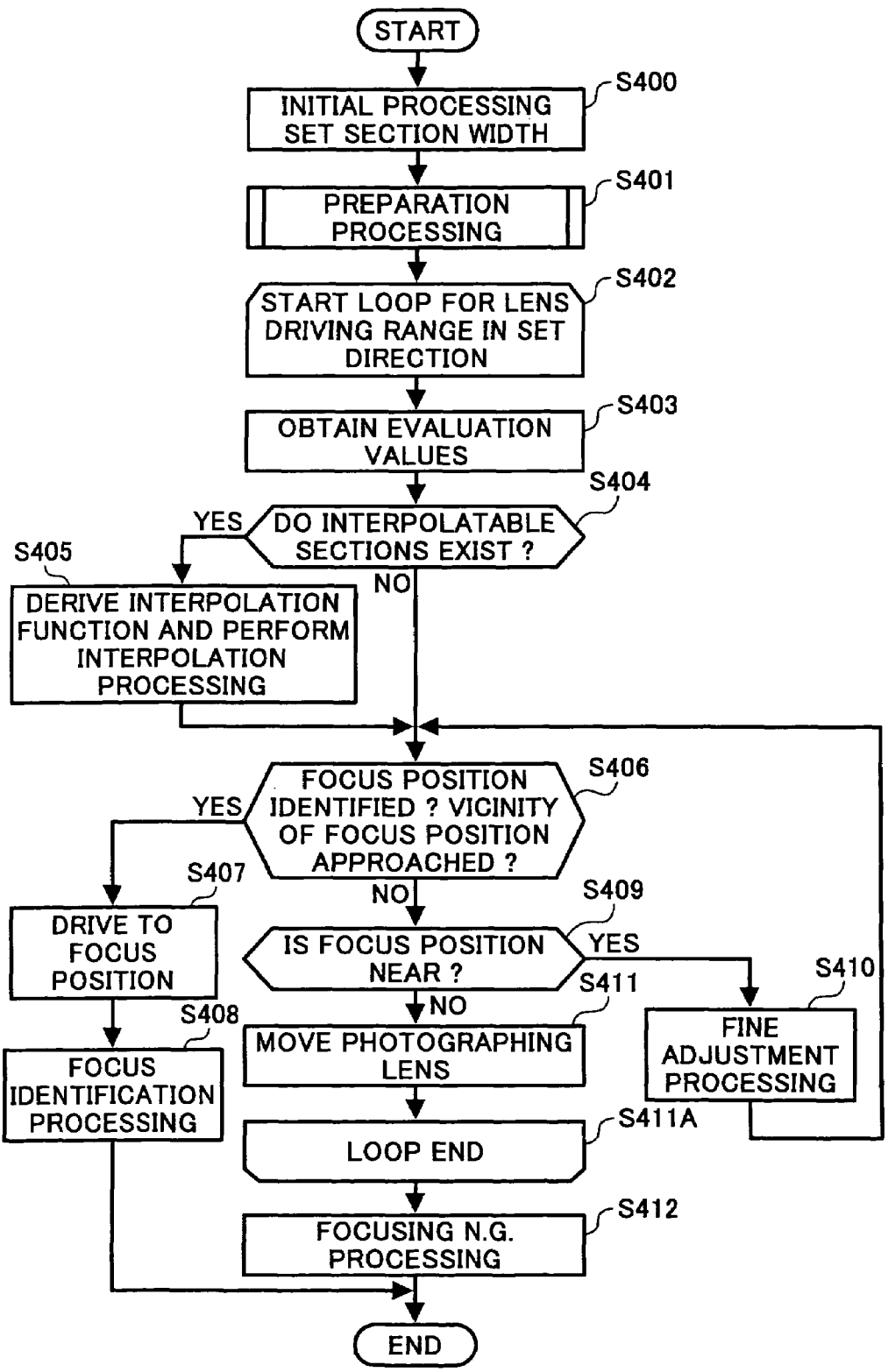

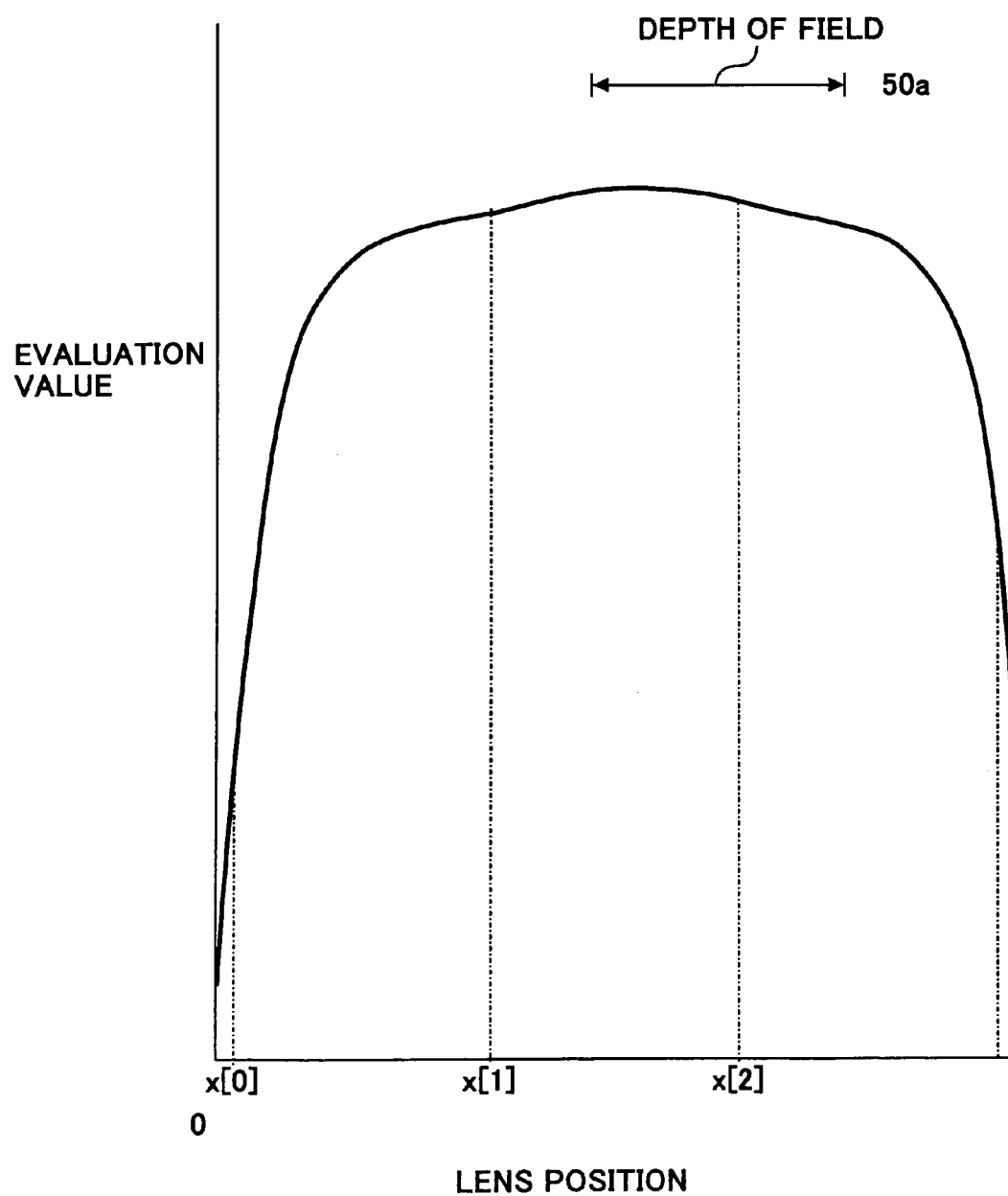

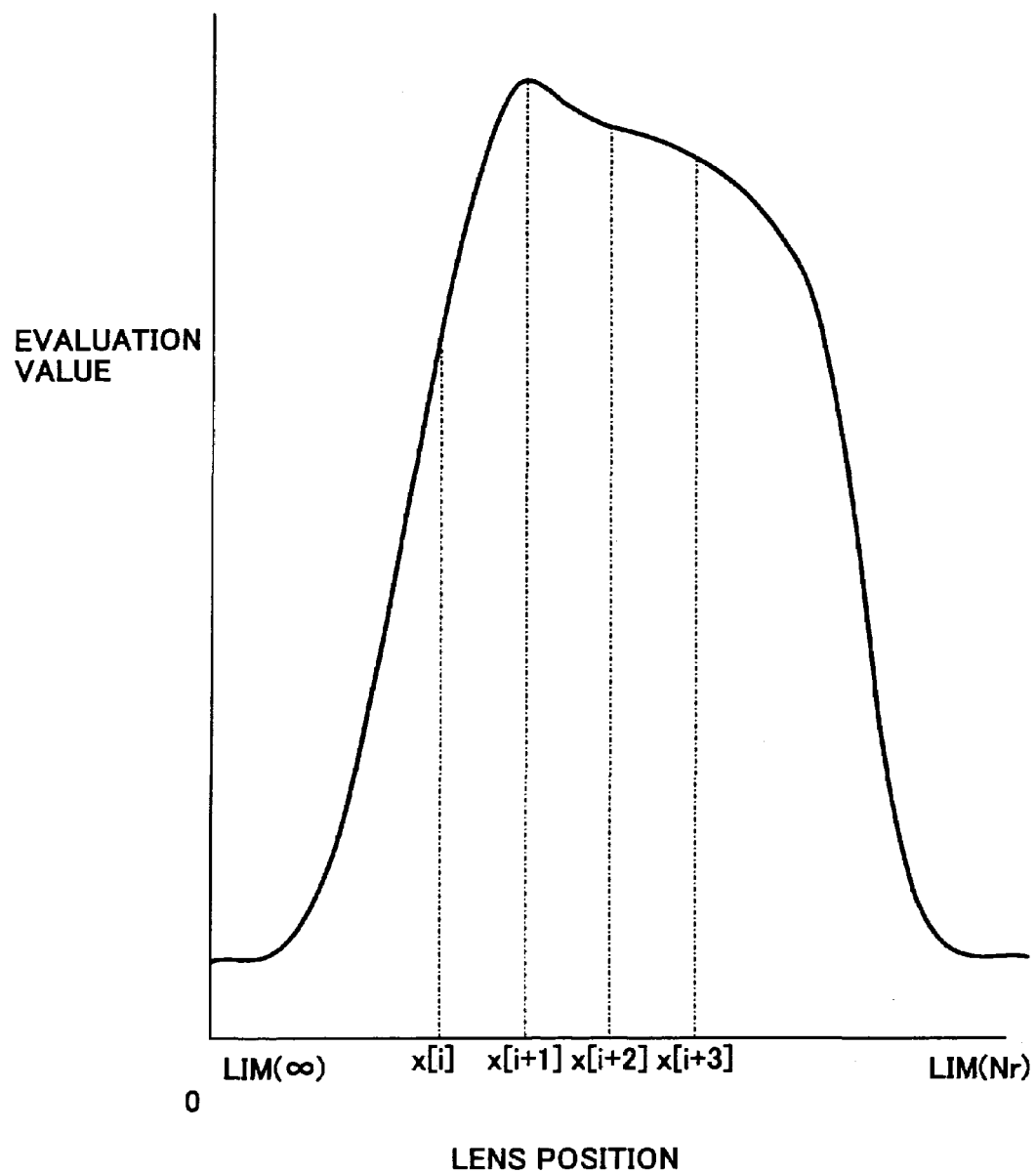

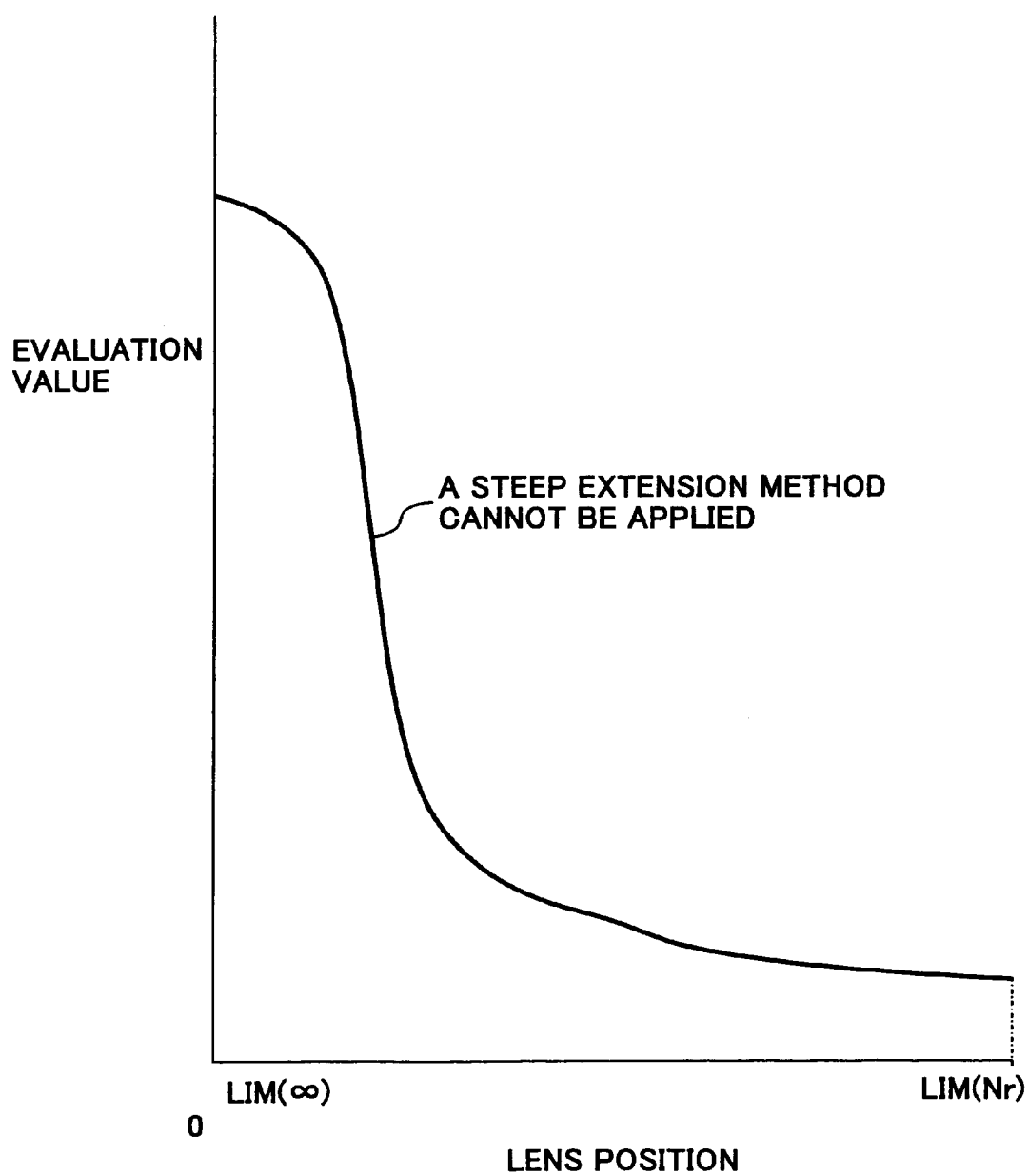

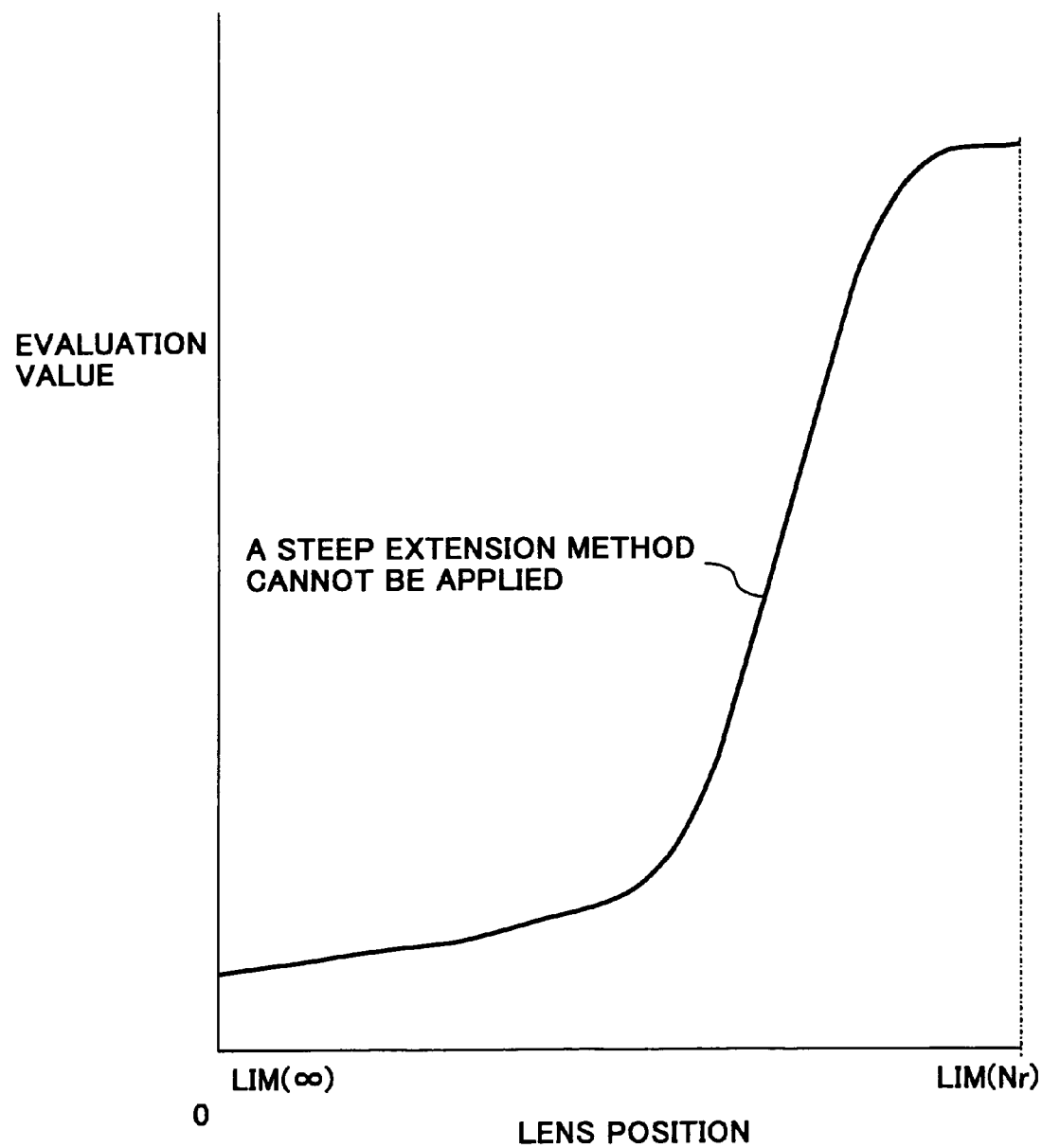

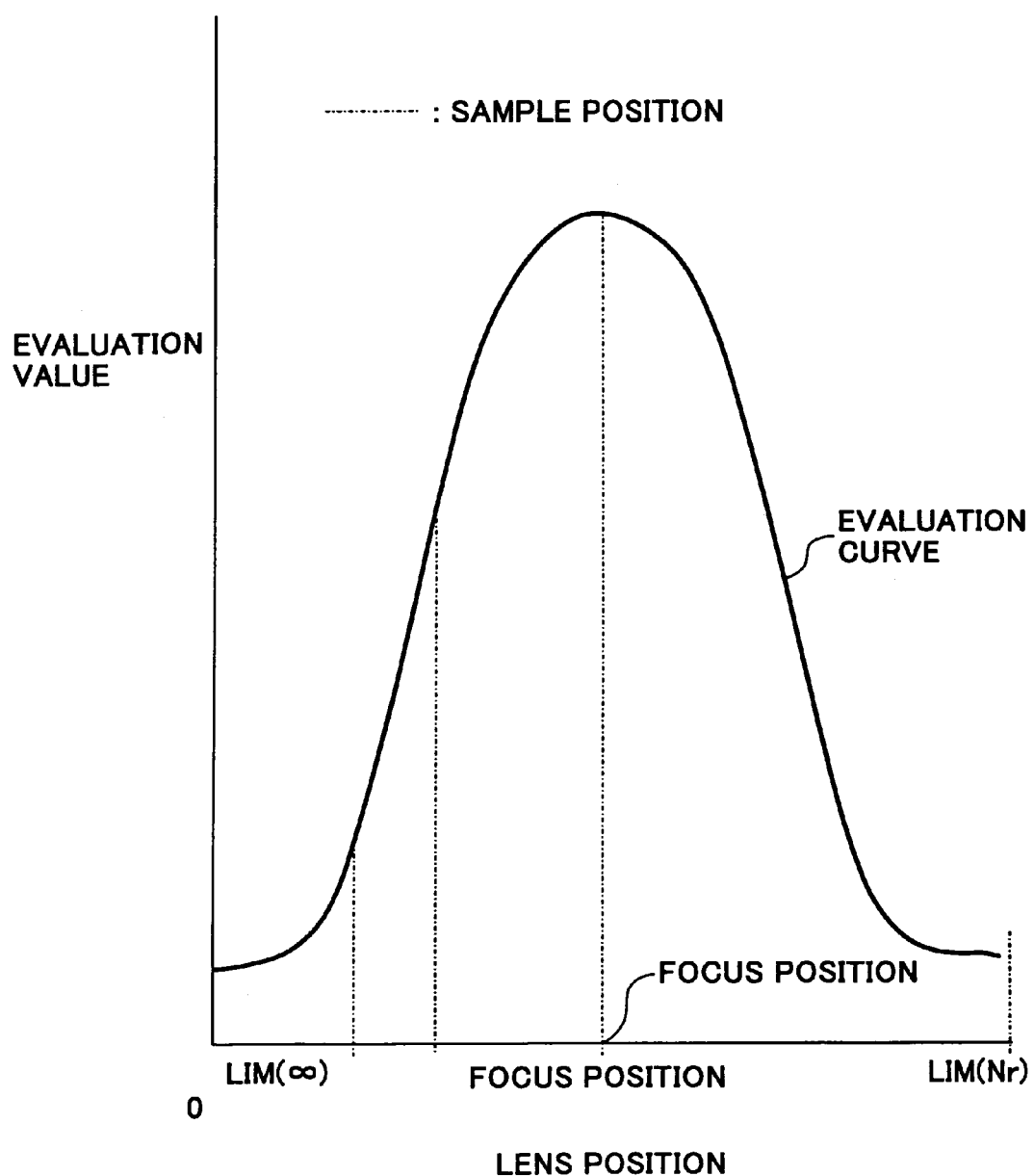

PHOTOGRAPHING APPARATUS WITH AUTOMATIC FOCUS

BACKGROUND OF THE INVENTION

1. Field of the Invention

The present invention relates to a photographing apparatus having a function capable of automatically focusing by detecting a focus position using auto-focus (AF) of a charge coupled device (CCD), namely, CCD-AF, for example.

2. Description of the Prior Art

A conventional photographing apparatus is, for example, a video camera, a digital camera, or the like. A conventional video camera employs a contrast system in order to perform auto-focusing. In this contrast system, with a focusing lens being driven, contrasts of photographed images acquired at respective driving steps are obtained as evaluation values, and a lens position having the highest evaluation value among them is set as a focus position.

In this video camera, a CCD photographing device used has pixels in the order of several hundreds of thousands because it is used to photograph moving images. For this reason, high accuracy in AF is not required. If a focusing speed is high too when photographing video, movement of focus will be frequently carried out in accordance with the movements of the camera and a subject, and hence user's eyes will not be able to follow the focus movement, thus causing the user to feel the abnormal of images.

In contrast, the digital cameras for photographing still-frame images are required to quickly perform auto-focusing and not to miss a shutter chance.

However, in digital cameras having a CCD photographing device with a high pixel density, because a focus position must be figured out with high accuracy, a lens position with the highest evaluation value is needed to be detected by repeating driving of a lens by a fine pitch based on the depth of field.

Thus, in the digital cameras using the CCD photographing device having high-density, the use of conventional contrast-system auto-focusing increases the driving number of lens, thus taking a long time to figure out a focus position, leading to miss a shutter chance.

Particularly, in cases where a subject is extremely out of focus, it will take a very long time to obtain the focus position, and hence it is necessary to efficiently perform auto-focusing so as not to miss the shutter chance.

In view of the above-mentioned problems of the contrast system employed in such video cameras, a digital camera that permits effectively obtaining a focus position is proposed (see, for example, Japanese Patent Laid-Open Publication No. 2001-281529).

In this digital camera, a driving circuit drives a photographing lens in several steps by a larger distance than the depth of field, figures out an evaluation value based on a photographed image obtained from the photographing device in each driving step, and then performs predetermined interpolation of a plurality of the evaluation values of plural driving steps, thereby obtaining a focus position of the photographing lens for causing a focal plane to coincide with a photographing plane. This driving circuit drives the photographing lens to the focus position based on focus position data obtained.

Thus, the conventional digital camera achieves reduction in time to obtain the focus position, while keeping high accuracy by the interpolation of the evaluation values.

However, since this camera drives the photographing lens by a larger interval or pitch than the depth of field, when dividing a scanning range for auto-focusing into intervals each being larger than the depth field, the appropriate accuracy of the interpolating operation cannot be obtained, or the interpolation cannot be performed depending on focal length and brightness of a lens (F number).

FIG. 13(a) shows a state of one example having the above-mentioned problem. In FIG. 13(a), a horizontal axis indicates a position of a photographing lens based on the reciprocal of a focal length (in detail, Lim ($\infty$) is referred to as a focal-length infinite distance, and Lim (Nr) is referred to as a focal-length closest position), while a vertical axis indicates a focusing evaluation value at each photographing lens position.

This curve of evaluation values has a feature that an intersection point of the horizontal axis and a line vertical to the horizontal axis passing through a maximum point of the evaluation value corresponds to a focus position.

FIG. 14 shows a general example.

In the case as shown in FIG. 13(a), the depth of field 50a is so large that there are few points for sampling, resulting in a low accuracy of interpolation.

As shown in FIG. 13(b), when a curved line of evaluation values is geometrically unsymmetrical with respect to a focal length of a photographing lens, highly accurate interpolation cannot be provided.

Further, as shown in FIGS. 13(c) and (d), in cases where a focus position is at an infinite distance, or at the closest point or its vicinity, a steep extension method used in the prior art cannot be employed, resulting in failing to conduct interpolation.

SUMMARY OF THE INVENTION

The present invention has been accomplished in view of the above-mentioned prior art. It is therefore an object of the present invention to provide a photographing apparatus offering an excellent balance of focus-position accuracy in an entire driving range and time needed for obtaining a focus position.

To this end, according to the present invention, there is provided a photographing apparatus comprising a photographing lens capable of moving a focal plane of a subject image, a photographing device for receiving the subject image and outputting a signal into which the subject image is photo-electrically transferred, as image output, driving means for driving the photographing lens, and control means for controlling the driving means.

This control means divides a range for enabling driving of the photographing lens into a minimum number of or more sections which are capable of being interpolated, drives the photographing lens to each divided section in sequence, figures out a focus signal based on a photographing signal obtained from the photographing device at the each driving position, and performs interpolation processing of an evaluation value obtained from the focus signal, thereby deriving a focus position of the photographing lens which position causes the focal plane to coincide with the photographing plane, and drivingly controlling the driving means to drive the photographing lens to the derived focus position.

Further, the control means figures out an auto-focus evaluation value based on the photographing signal obtained from the photographing device at the each driving position, figures out an interpolation function from data on the each driving position and the auto-focus evaluation value, and performs the interpolation processing of the section based on the interpolation function, thereby to permit figuring out the focus position of the photographing lens for causing the focal plane to coincide with the photographing plane of the photographing device.

Further, the data on the auto-focus evaluation value may be generated by use of a frequency filter. In this case, the data on a plurality of the auto-focus evaluation values may be generated by a plurality of the frequency filters. Moreover, in this case, some or all of the data on the auto-focus evaluation values generated are preferably subjected to the interpolation processing, thereby figuring out the focus position.

Further, the interpolation processing may be conducted by use of a Spline Function. Also, the Spline Function may be a natural Spline function. Further, the Spline Function may be established by a differential coefficient. The Spline Function may be derived as, at most, a tertiary function formula by obtaining a second-order differential coefficient.

In the interpolation processing, Newton's divided differences interpolation formula of an order of the number of sections or less may be utilized for the interpolation processing at the each section. Further, in the interpolation processing, a divided difference at a boundary between the sections may be figured out for the interpolation processing at each section, and then the divided difference may be substituted into a predetermined formula, thereby obtaining an interpolation value.

Further, this predetermined formula may be, at most, a tertiary function to an unknown, and the divided difference to be substituted may be excluded from a constant term.

Further, in the interpolation processing, the interpolation function may be derived for the section capable of being interpolated, and then the interpolation function may be used for all driving positions of the photographing lens in the section, thereby deriving an evaluation value in a dummy manner.

In this case, if there are any sections capable of being interpolated, obtaining processing of the evaluation value may be conducted in parallel with the interpolation processing.

As a result of this interpolation processing, when the focus position having a maximum evaluation value is identified, the obtaining processing of the evaluation value and the interpolation processing of the yet-to-be interpolated section may be stopped, and then the photographing lens may be driven to the section including the focus position. As the result of this interpolation processing, when the focus position turns out to be near, the control means may be shifted to fine adjustment. Further, in this fine adjustment, the photographing lens is moved such that a driving distance of the photographing lens is preferably below a section width, but a minimum driving distance or more, thereby obtaining the evaluation value.

BRIEF DESCRIPTION OF THE ATTACHED DRAWINGS

FIG. 1 is a block diagram showing a control circuit of a photographing apparatus according to a preferred embodiment of the present invention.

FIGS. 2(a) and (b) each are an exemplary graph showing an evaluation value with respect to a lens position.

FIG. 3 is an explanatory flowchart of an auto-focus operation according to the preferred embodiment.

FIGS. 4(a), (b), and (c) each are a flowchart showing interpolation processing according to the preferred embodiment.

Figure 9A:
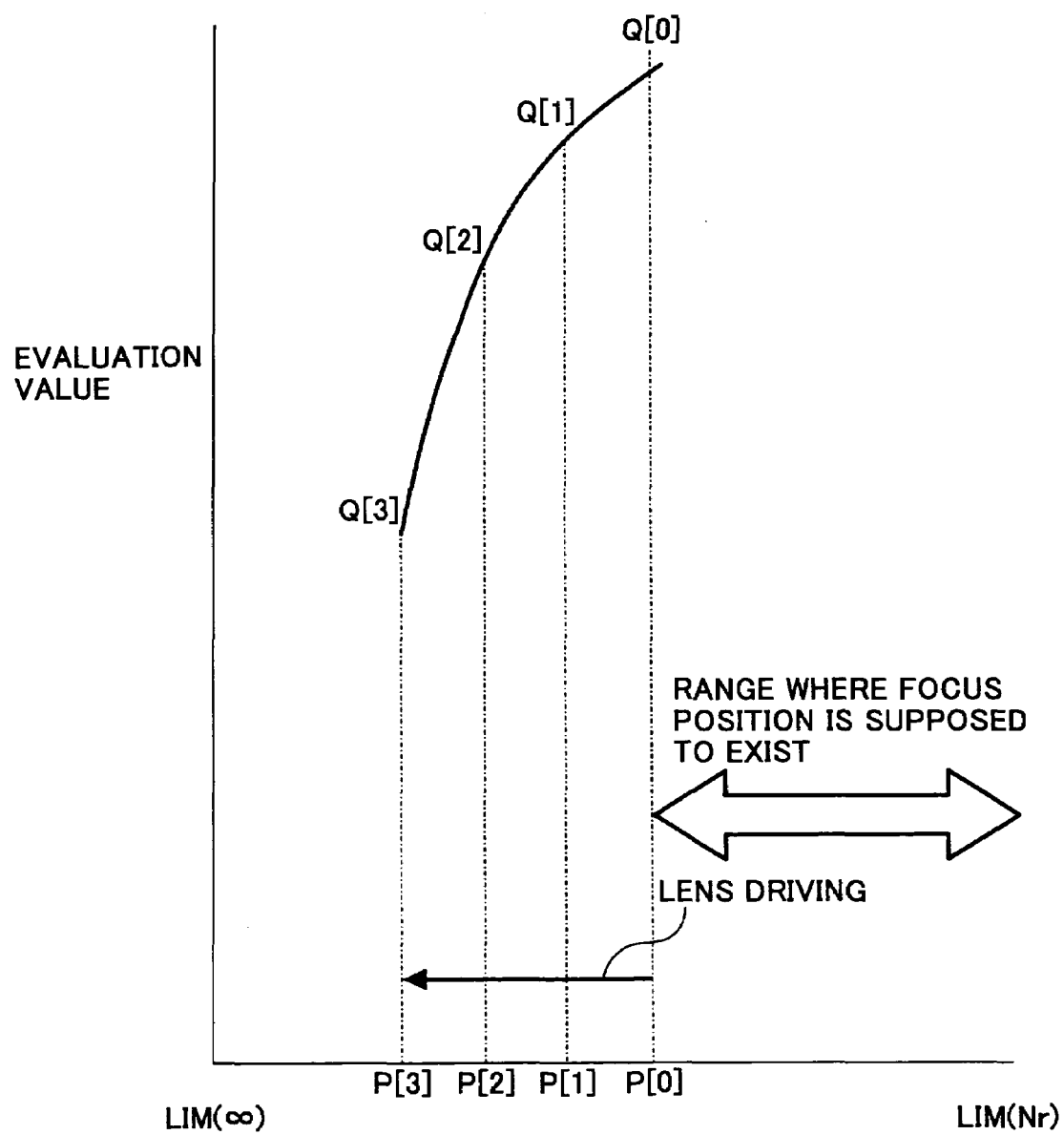

FIGS. 9(a) and (b) each are an explanatory graph for anticipating a focus position in an initial stage of the processing.

Figure 10:
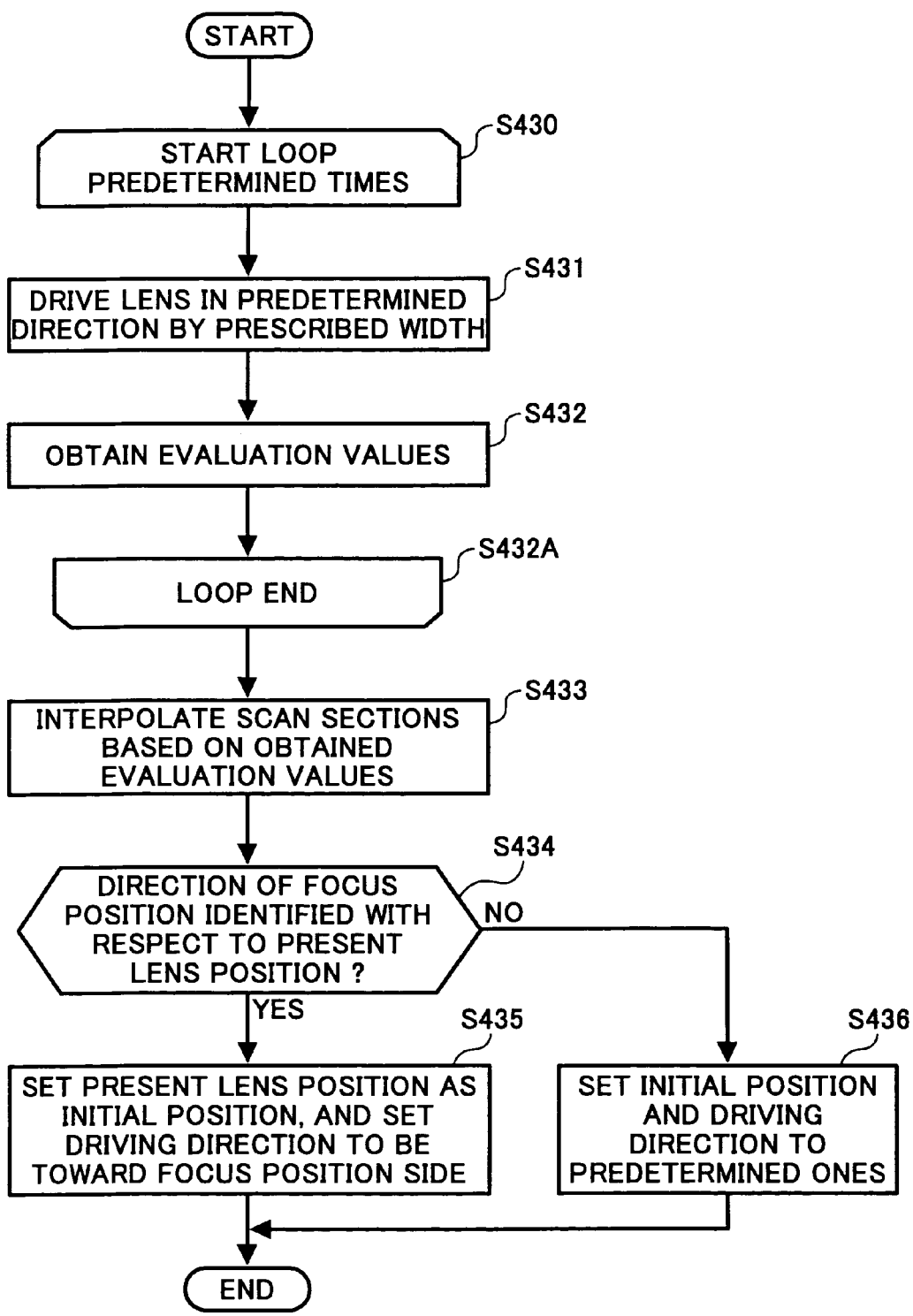

FIG. 10 is a flowchart of preparation processing in the auto-focus processing.

FIG. 11 is a flowchart of main processing in the auto-focus processing.

Figure 12A:
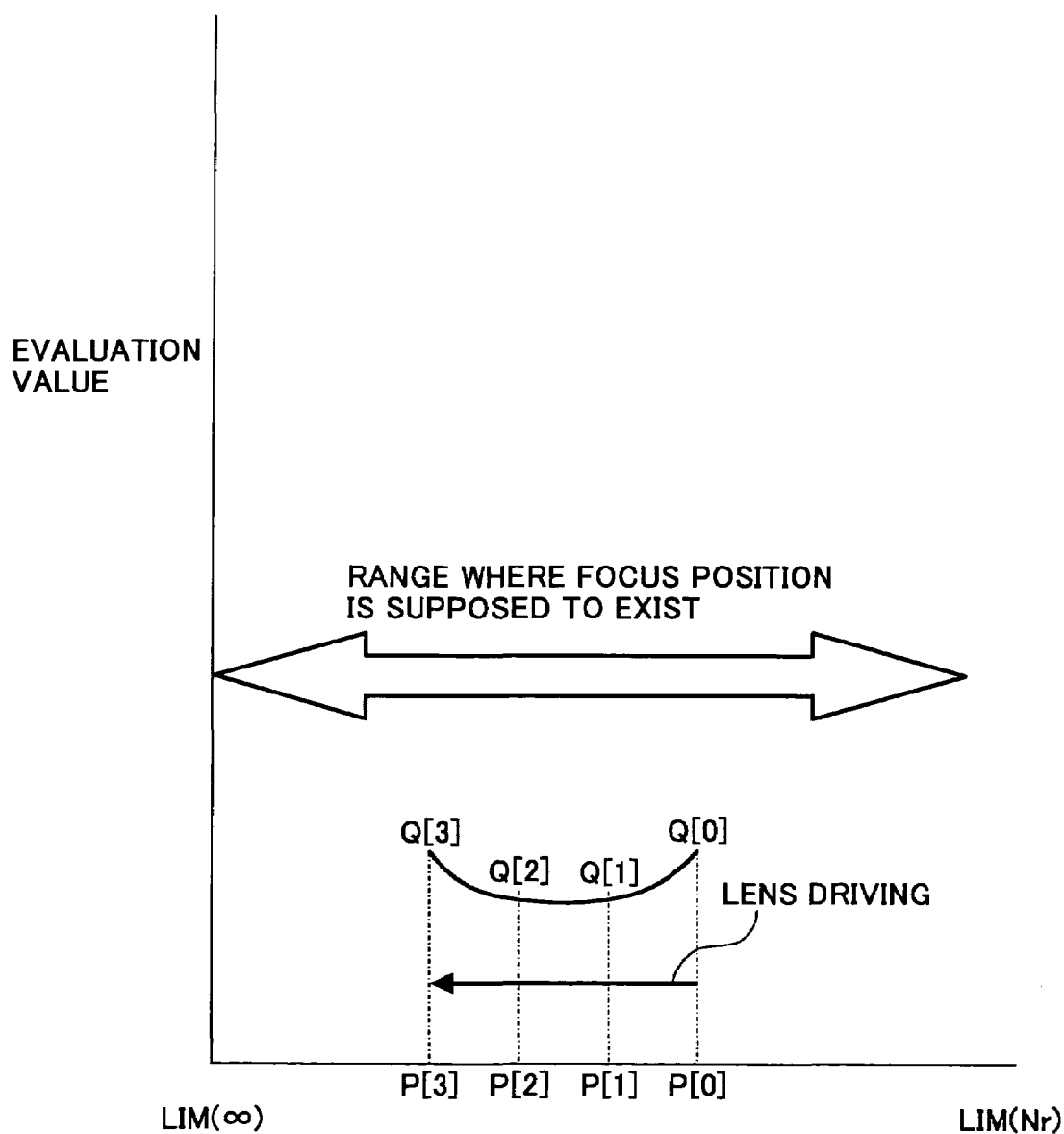

FIGS. 12(a) and (b) each are an explanatory graph for anticipating a focus position in cases where a driving direction of a photographing lens is not judged in an initial stage of the processing.

FIGS. 13(a), (b), (c), and (d) each are an explanatory graph showing problems In the prior art.

FIG. 14 is a graph showing a general example of a focus position.

DESCRIPTION OF THE PREFERRED EMBODIMENTS

First Preferred Embodiment of the Present Invention

Hereinafter a photographing apparatus according to some preferred embodiments of the present invention will be described in detail with reference to the accompanying drawings.

Figure 1:
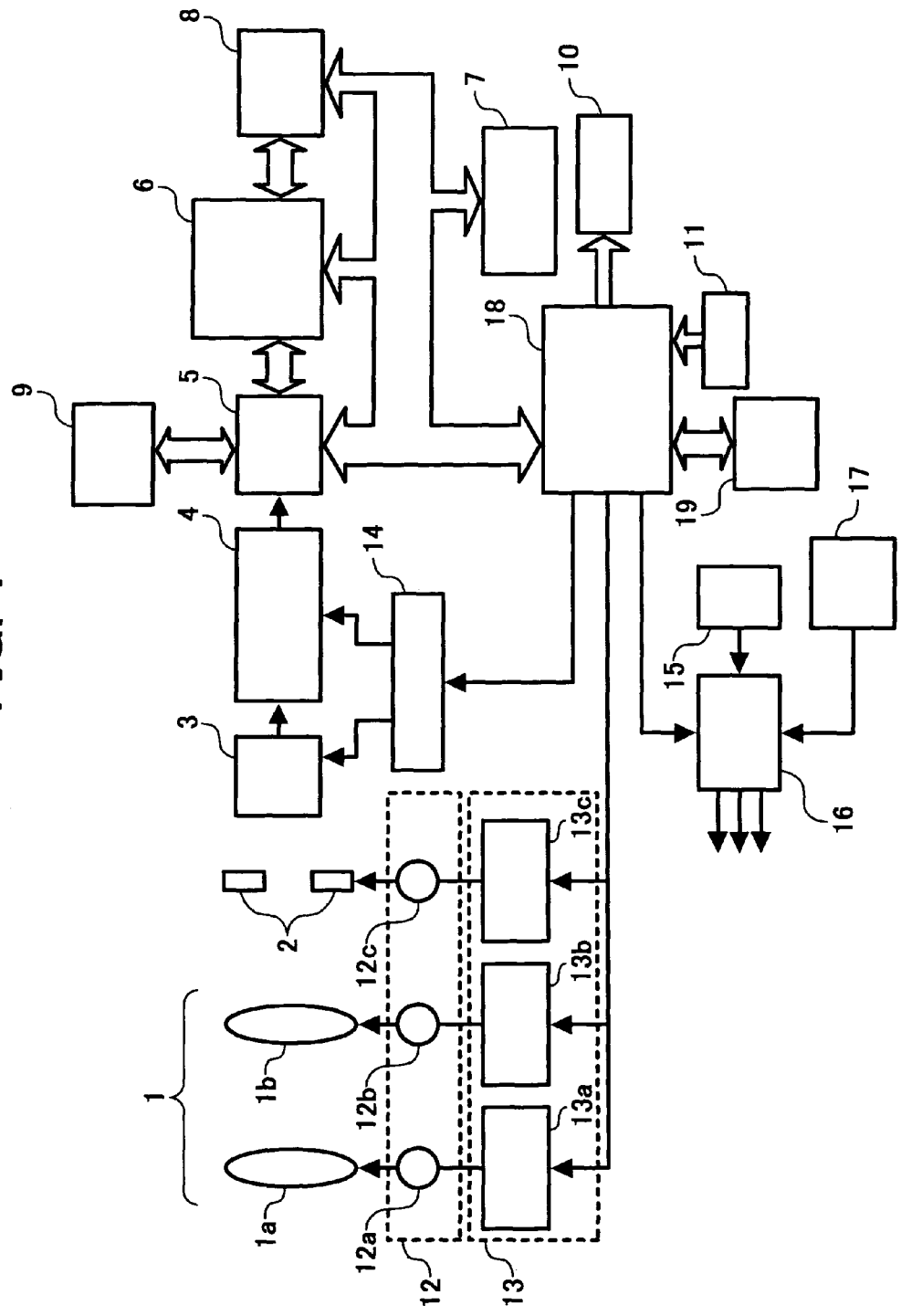

FIG. 1 shows a block diagram of the photographing apparatus in accordance with the first preferred embodiment of the present invention. Reference numeral 1 denotes a photographing lens including a zoom lens 1a and a focus lens 1b. Reference numeral 2 denotes a mechanical system including a mechanical shutter, a diaphragm, a filter, and the like. Reference numeral 3 denotes a CCD, and reference numeral 4 a front/end (F/E) including a correlated double sampling (CDS) circuit, an A/D conversion circuit, an automatic gain control (AGC) circuit, and the like. Reference numeral 5 denotes an image pre-processor (IPP), reference numeral 6 a compression/decompression device, reference numeral 7 a liquid crystal monitor, reference numeral 8 a memory card, reference numeral 9 a DRAM, reference numeral 10 a sub-liquid-crystal-display (sub-LCD), and reference numeral 11 an operating section. Reference numeral 12 denotes a motor section including a zoom lens motor 12a, a focus motor 12b, and a diaphragm and shutter motor 12c. Reference numeral 13 denotes a driver including a zoom driver 13a, a focus driver 13b, and a diaphragm and shutter driver 13c. Reference numeral 14 denotes a timing generator (TG), reference numeral 15 a battery, reference numeral 16 a DC/AC converter, reference numeral 17 an AC adapter, reference numeral 18 a CPU, and reference numeral 19 a synchronous dynamic random access memory (SDRAM).

The photographing lens 1 is to form images of a subject and comprises the zoom lens 1a for performing a zoom function and the focus lens 1b for bringing the subject into focus. The mechanical system 2 includes the mechanical shutter, the diaphragm for adjusting brightness of the subject, the filter, and the like. The CCD 3 converts a subject image formed by the photographing lens 1 into an electric signal and then outputs it to the F/E 4 as analog image data.

The F/E 4 subjects pre-processing to the analog image data inputted from the CCD 3. This F/E 4 includes the CDS circuit for performing correlated double sampling of the analog image data inputted from the CCD 3, the AGC circuit for adjusting gains of the analog image data outputted from the CDS circuit, and the A/D conversion circuit for performing A/D conversion of the analog images outputted from the AGC circuit and for outputting converted digital image data to the IPP 5.

The IPP 5 performs various kinds of image processing of the inputted image data. For example, it converts RGB data inputted from the F/E 4 into YUV data.

The compression/decompression device 6 performs compression processing of the YUV data in a compression format in compliance with JPEG format and performs decompression processing of compressed image data stored in the memory card 8 in a decompression format in compliance with the JPEG format.

The DRAM 9 is a frame memory for temporarily storing the image data photographed or the image data read from the memory card 8. The memory card 8 is attached detachably to a digital camera body and stores the compressed image data as an image file.

The liquid crystal monitor 7 is to display the image data and the like. The sub-LCD 10 is to display modes and operation contents set for the digital camera.

The zoom driver 13a drives the zoom motor 12a in response to a control signal inputted from the CPU 18 to move the zoom lens 1a in an optical axis. The focus driver 13b drives the focus motor 12b in response to a control signal inputted from the CPU 18 to move the focus lens 1b in an optical axis. The diaphragm and shutter driver 13c drives the diaphragm and shutter motor 1c in response to a control signal inputted from the CPU 18 to perform setting of a diaphragm value of the mechanical system 2 and to drivingly open and close the mechanical shutter of the mechanical system 2.

The TG 14 drives the CCD 3 and the F/E 4 based on a control signal inputted from the IPP 5. The battery 15 is, for example, a NiCd battery, a nickel-hydrogen battery, a lithium battery, or the like. The DC/AC converter 16 converts the level of DC voltage inputted from the battery 15 or the AD adapter 17 to supply power to each component of the photographing apparatus.

Now, processing contents of the CPU 18 serving as calculation control circuit (control means), that is, an auto-focus control operation performed by the CPU 18, will be described in detail with reference to FIGS. 1, 2, and 3.

FIG. 2 shows an exemplary graph of an evaluation value with respect to a lens position. FIG. 3 shows an explanatory flowchart of the auto-focus operation in accordance with the preferred embodiment.

Figure 3:
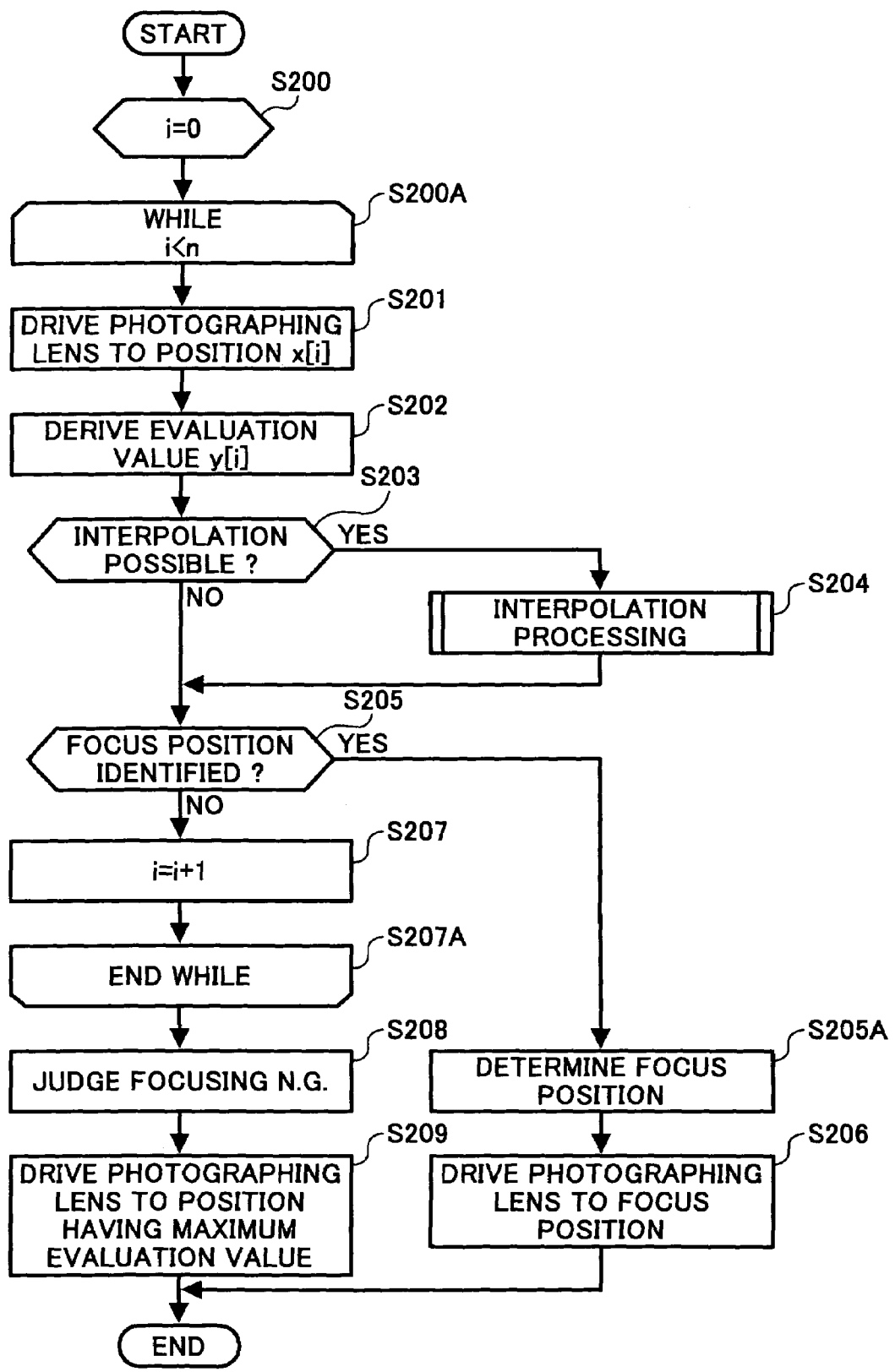

An auto-focus processing system receives an auto-focus signal outputted from the CPU 18 and conducts the processing according to the flowchart of FIG. 3. That is, the CPU 18 serving as the calculation control circuit (control means) inputs the auto-focus signal into the auto-focus processing system to make the auto-focus processing system conduct driving processing of the photographing lens 1 in compliance with the flowchart of FIG. 3.

When performing this auto-focus processing, the CPU 18 triggers a reset in a step S200 to set i=0, and then performs conditional processing in steps S200A to S207A.

Figure 2A:
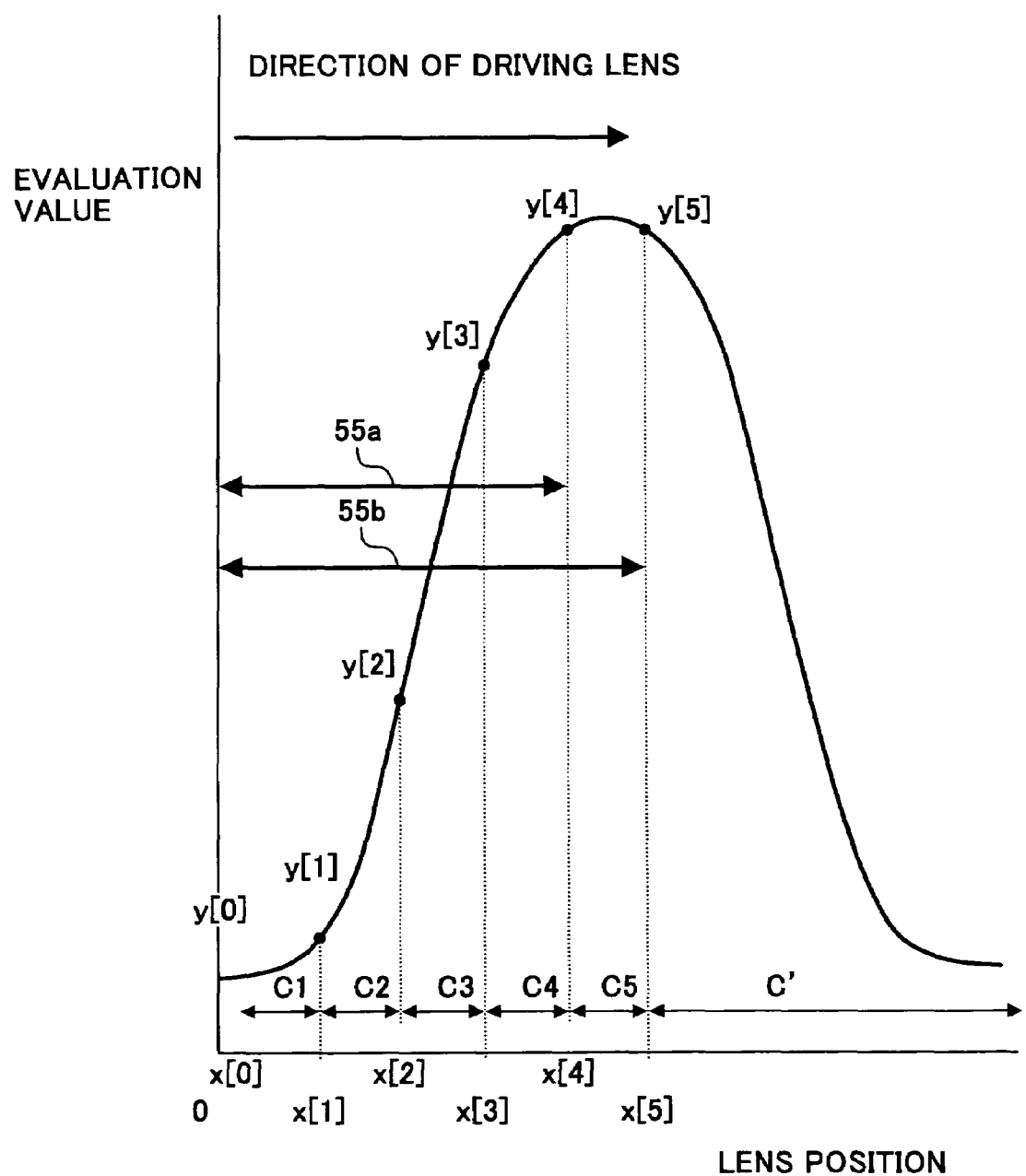

In the above-mentioned conditional processing, the CPU 18 drivingly controls the motor section 12 by means of the driver 13 and drives the lens to move a present position thereof to an initial position x[0] as shown in FIG. 2(a) (S201). Although a focal length is set to be the lens position Lim (∞) where is at an infinite distance in this embodiment, the initial position is not limited thereto.

Next, the CPU 18 determines a driving distance, depending on a depth of field which is determined based on a focal length of the zoom lens 1a and lens brightness. In this embodiment, the driving distance is set to be an integer multiple of a minimum driving distance. It should be noted that the driving distance is not limited to an integer multiple of the minimum driving distance.

Then the CPU 18 drives the photographing lens 1 based on the determined driving distance to obtain an evaluation value y[i] with respect to a lens position x[i] (i: integer) via the IPP 5 on the basis of an image signal obtained by the CCD 3 serving as a photographing device at a present point in time (S202). The obtained evaluation value is stored in the SDRAM 19.

Next, the CPU 18 determines whether there are any sections capable of being interpolated or not (S203). Based on this determination, when it is determined that there are any interpolating sections, the CPU 18 conducts interpolation processing of the interpolating sections so as to provide a corresponding interpolation value at each minimum driving distance (S204).

If there is no interpolating section in the step S203, or if the interpolation processing is already done in the step S204, the CPU 18 determines whether a focus position exits or not based on the evaluation values and the interpolation values thereof (S205).

When the focus position is identified, the CPU 18 executes judgment of focus to drive the photographing lens 1 to the focus position, thereby terminating the auto-focus processing (S205A, S206). When the focus position is not identified, the CPU 18 moves the photographing lens 1 to a next driving position (S207). Thereafter, the conditional processing of the steps S202 through the S207 among the steps S200A through the S207A is repeatedly performed.

In cases where the focus position is not identified even when the photographing lens 1 is driven to the closest position in the conditional processing of the steps S200A to 207A, the CPU 18 makes a judgment of "focusing N.G." in a step S208 indicating that the focus position does not exist, and then performs focusing N.G. processing in a step S209. That is, the CPU 18 drives the photographing lens 1 to a position having a maximum evaluation.

(Interpolation Processing 1)

Now, the processing performed by the CPU 18 in the steps S203 and S204 of FIG. 3, namely, the judgment or determination of the existence of interpolating sections and the interpolation processing, will be described in detail with reference to FIGS. 2, 3, and 4.

Figure 2B:
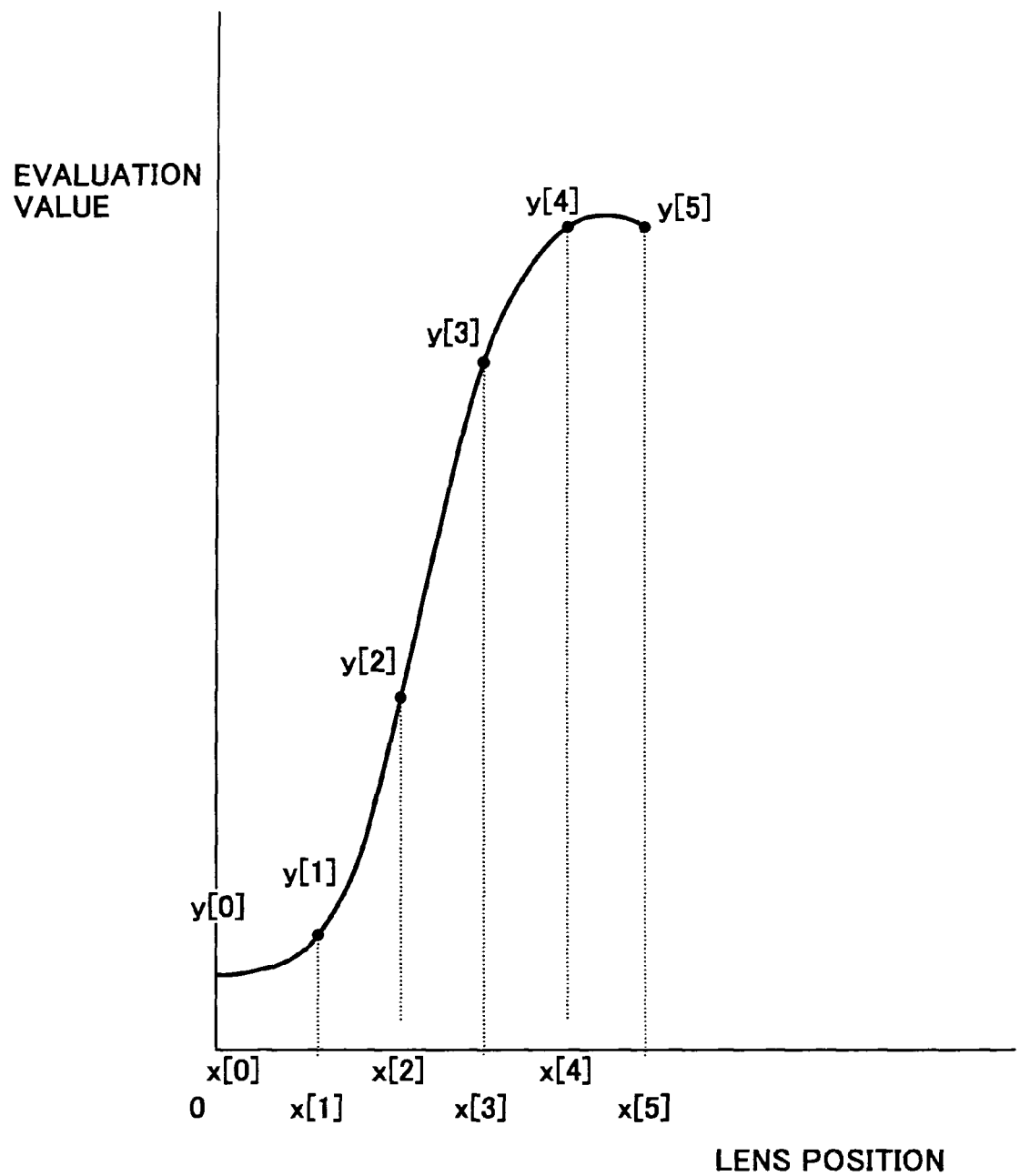

FIG. 2(a) shows a plot of points with a horizontal axis indicating a lens position and a vertical axis indicating an evaluation value for each position of the points. In an example of FIG. 2(a), evaluation values y[0], y[1], y[2], y[3], y[4], and y[5] are determined with respect to lens positions x[0], x[1], x[2], x[3], x[4] and x[5]. And by using the evaluation values y[0], y[1], y[2], y[3], y[4], and y[5], a tertiary natural Spline Function is derived, thereby interpolating evaluation values located in lens positions other than the lens positions x[0], x[1], x[2], x[3], x[4] and x[5] (for example, a curve of a solid line as shown in FIG. 2(b) is derived).

In general, once four via points are determined, a tertiary natural spline function is capable of being uniquely derived. In the interpolation of the present embodiment, however, a section C5 of FIG. 2(a) is not preferably subjected to interpolation. This is why there is a high possibility that an yet-to-be scanned section C' does not have the same tendency as the section C5 which is interpolated at the present time. In the case of the example of FIG. 2(a), sections C1, C2, C3, and C4 (range 55a) are subjected to the interpolation. In other words, when evaluation values of the lens positions x[0] through x[k] are determined, the CPU 18 judges that the sections C1 through C(k−1) are capable of being interpolated. And if there are any yet-to-be interpolated sections among them, the CPU 18 conducts the interpolation processing.

Now, the interpolation processing in cases where an interpolating section exists will be explained in detail by taking an example in which the sections C1 through C4 (range 55a) of FIG. 2(a) are to be interpolated.

Figure 4A:
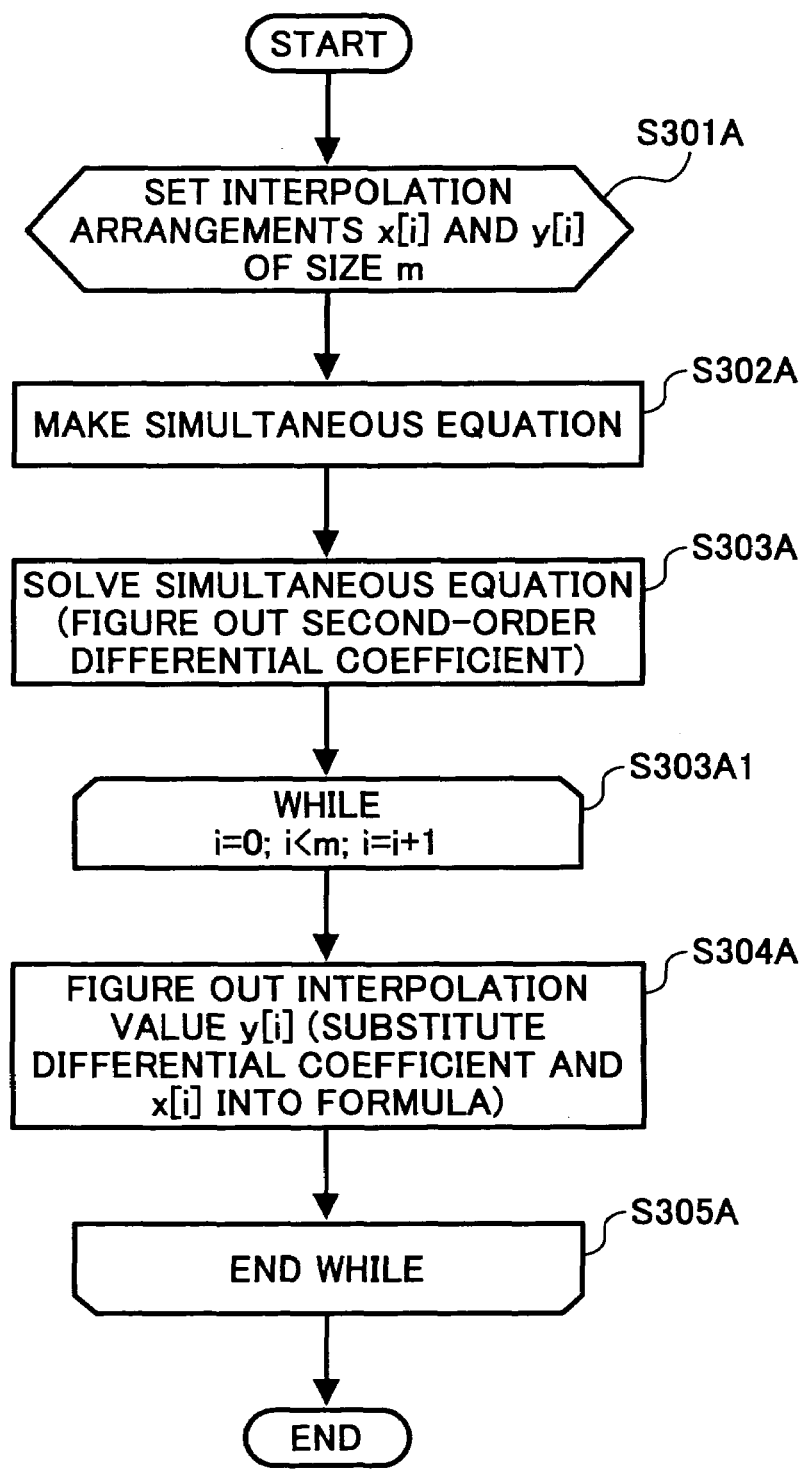

FIG. 4(a) is a flowchart showing the interpolation processing in accordance with the preferred embodiment. First, the CPU 18 defines all of lens driving positions in sections to be interpolated (S301A). That is, the CPU 18 defines one-dimensional arrangement for storing two data (x, y). (In other words, it sets interpolation arrangements x[i] and y[i] of a size m.) And it stores lens positions in the x and interpolation values in the y. In FIG. 4(a), as reset processing of arrangements is performed definition of the arrangements and storing processing of the lens positions in the data x.

Then, the CPU 18 figures out second-order differential coefficients M [1] through M [4] of the natural spline function at the x[1] through x[4]. Thus, a linear simultaneous equation represented by the following formula [Formula No. 1] is made (S302A).

AM=B $$A = \begin{pmatrix} (h[1]+h[2])/3 & h[2]/6 & 0 & \cdots & 0 \\ h[2]/6 & (h[2]+h[3])/3 & h[3]/6 & \cdots & 0 \\ 0 & & & & \\ 0 & 0 & 0 & h[n-2]/6 & (h[n-2]+h[n-1])/3 \end{pmatrix}$$

$M=(M[1], M[2], \ldots, M[n-2])^T$ $B=(b[1], b[2], \ldots, b[n-2])^T;$ $b[i]=((y[i+1]-y[i])/h[i+1])-\{(y[i]-y[i-1])/h[i]\}$     [Formula No. 1]

A character n denotes the number of data scanned. In this embodiment, in the Case of n=6, there are provided four unknowns, namely M[1] through M[4], thus leading to a fourth-order linear simultaneous equation, Note that a character h[i] indicative of a section width is defined by the following formula [Formula No. 2].

$h[i]=x[i]-x[i-1];$ $i=1,2,\ldots,n-1$     [Formula No. 2]

The above-mentioned simultaneous equation is solved by Jordan-Gauss elimination method to obtain the second-order differential coefficients M[1] through M[4] (S303A). Note that the second-order differential coefficient M[0] at the x[0] is set 0.

Then, the CPU 18 figures out an interpolation value between one lens driving position x[i] and the other, that is, an interpolation value between one evaluation value y[i] and the other in the sections C1 through C4 (range 55a) (S304A).

Hereinafter, an interpolation value in the C2 between the lens driving positions x[1] and x[2], namely, an interpolation value between the evaluation values y[1] and y[2], will be explained in detail. The interpolation value C[2](x) at the lens position x in the section C2 will be obtained by solving the following formula [Formula No. 3] by substitution of k=2, namely, by substitution of M[1], M[2], h[2], x[1], and x[2].

$$C[k](x) = \frac{M[k-1](x-x[k])(h[k]^2 - (x-x[k])^2)}{6h[k]} + \frac{M[k](x-x[k-1])\{(x-x[k-1])^2 - h[k]^2\}}{6h[k]} + \frac{y[k](x-x[k-1]) - y[k-1](x-x[k])}{h[k]}$$ [Formula No. 3]

The same deriving processing of interpolation values for all lens driving positions in the section C2 is performed, thus achieving interpolation in the section C2.

The above-mentioned interpolation processing is conducted by utilizing characteristics of the natural spline function, or a gently-sloping interpolation function having the lowest level of distortion. This enables making satisfactory approximations of a number of functions which appear in optical phenomena. Further, the interpolation processing is achieved in calculation time proportional to the number of lens driving positions within this interpolation range, thereby to avoid putting a load on a calculation processor. In addition, once a second-order differential coefficient is figured out, the coefficient can be reused. Therefore, there is an advantage in that only second-order differential coefficients of a section newly added and a sample point have only to be figured out for further data.

It should be noted that when obtaining evaluation values, image signals may be subjected to frequency filters so as to grab spatial frequencies, whereby obtaining the evaluation values based on the output. Concretely, an image signal obtained from the photographing device is divided into a high frequency component and a low frequency component through a frequency filter based on a Fourier transform. In general, the high frequency component allows interpolation with high focusing accuracy, while the low frequency component allows interpolation of a wider section, compared to the high frequency component. Therefore, either or both of frequency components may be used for the interpolation, thereby performing auto-focus processing according to a situation.

(Interpolation Processing 2)

Figure 4B:
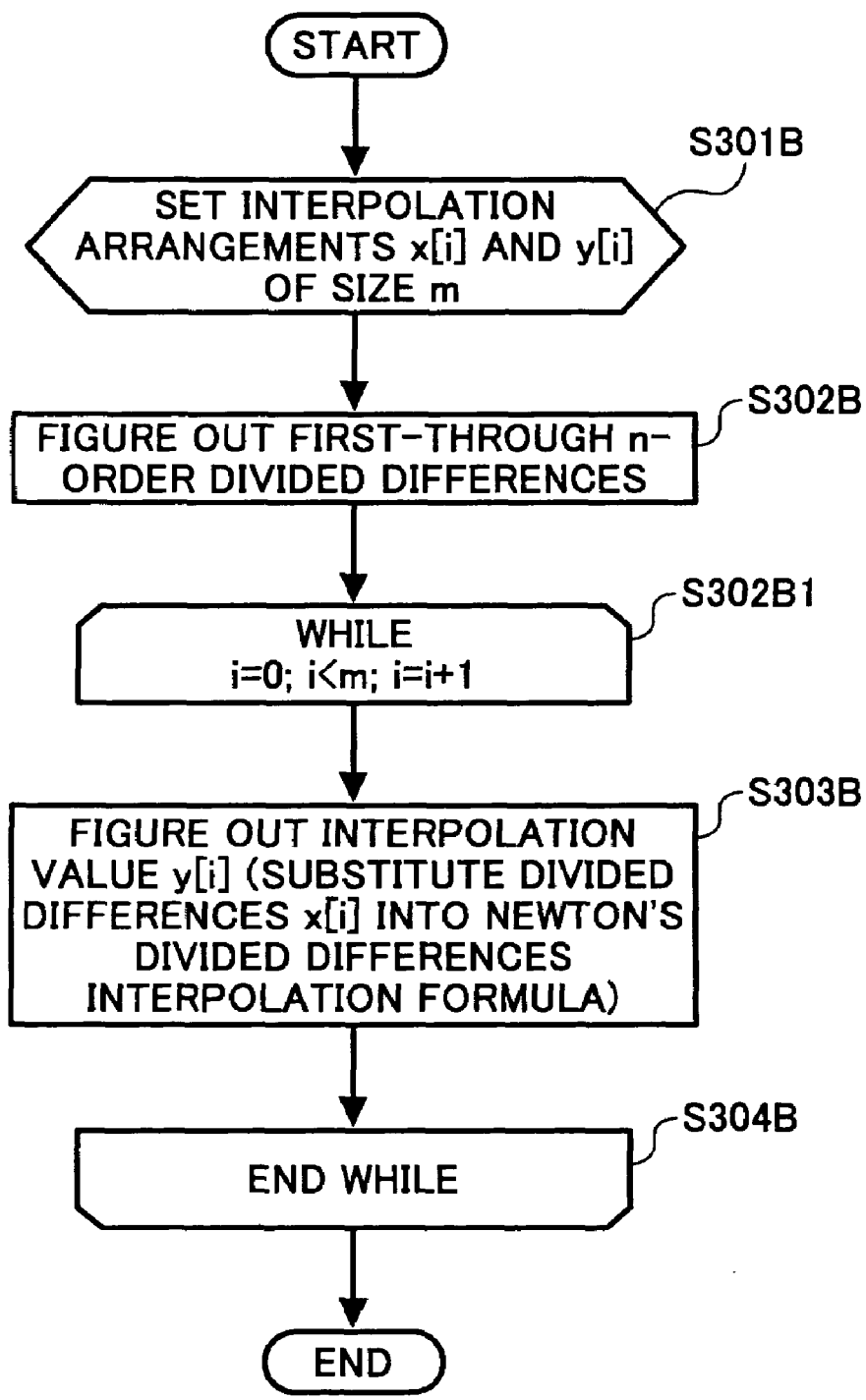

Now, another interpolation processing (interpolation processing 2) will be explained in detail with reference to FIG. 4(b). In this example, the situation of FIG. 2(a) will also be taken as an example, as is the case with the above-mentioned interpolation processing.

The interpolation processing 1 conducts the interpolation processing by deriving the tertiary normal spline function, while the interpolation processing 2 conducts interpolation processing by using Newton's divided differences interpolation formula.

In the interpolation processing using the Newton's divided differences interpolation formula, for n sample points can be performed the interpolation by means of a (n−1)-th order function. In this embodiment, a fifth-order function is used to perform the interpolation. In this case, the sections C1 through C5 (range 55b) can be subjected to the interpolation.

First, the CPU 18 defines all of lens driving positions in sections to be interpolated (S301B). Then, the CPU 18 defines one-dimensional arrangement for storing two data (x, y). (In other words, it sets interpolation arrangements x[i] and y[i] of a size m.) And it stores lens positions in the data x and interpolation values in the data y. In FIG. 6(b), as reset processing of arrangements is performed definition of the arrangements and storing processing of the lens positions in the data x.

Next, as to sampling points x[0], x[1], x[2], x[3], x[4], x[5], y[0], y[1], y[2], y[3], y[4], and y[5], the CPU 18 figures out a zero-order divided difference f(x[0])=y[0], a first-order divided difference f(x[0], x[1]), second-order divided differences f(x[0], x[1], x[2]), third-order divided differences f(x[0], x[1], x[2], x[3]), fourth-order divided differences f(x[0], x[1], x[2], x[3], x[4]), and fifth-order divided differences f(x[0], x[1], x[2], x[3], x[4], s[5]), based on the following formula [Formula No. 4] (S302B).

$$f(x[1], x[2], \ldots, x[n]) = \sum_{i=1}^{n} y[i] \prod_{j=1}^{n} (x[i] - x[j])$$ [Formula No. 4]

Without i

In order to figure out an evaluation value f(x) at each lens driving position x in the sections C1 through C5 (range 55b), the CPU 18 substitutes x into the Newton's divided differences interpolation formula, namely, a fifth-order formula including a constant term y[0] based on the following formula [Formula No. 5] (in a step S303B between the steps S302B and S304B), thereby achieving the interpolation of the sections C1 through C5 (range 55b).

[Formula No. 5]

$$f(x)=f(x[1])+(x-x[1])f(x[1], x[2])+(x-x[1])(x-x[2])f(x[1],x[2], x[3])+\ldots +(x-x[1])(x-x[2])\ldots (x-x[n-1])f(x[1], x[2],x[3], \ldots, x[n])$$ [Formula No. 5]

Thus, the interpolation processing by means of the Newton's divided differences interpolation formula has advantages not only in solving the problems in the prior art, but also in reducing calculation time, compared to that required for the natural-spline-function interpolation of the same order because its algorithm is easy.

(Interpolation Processing 3)

Figure 4C:
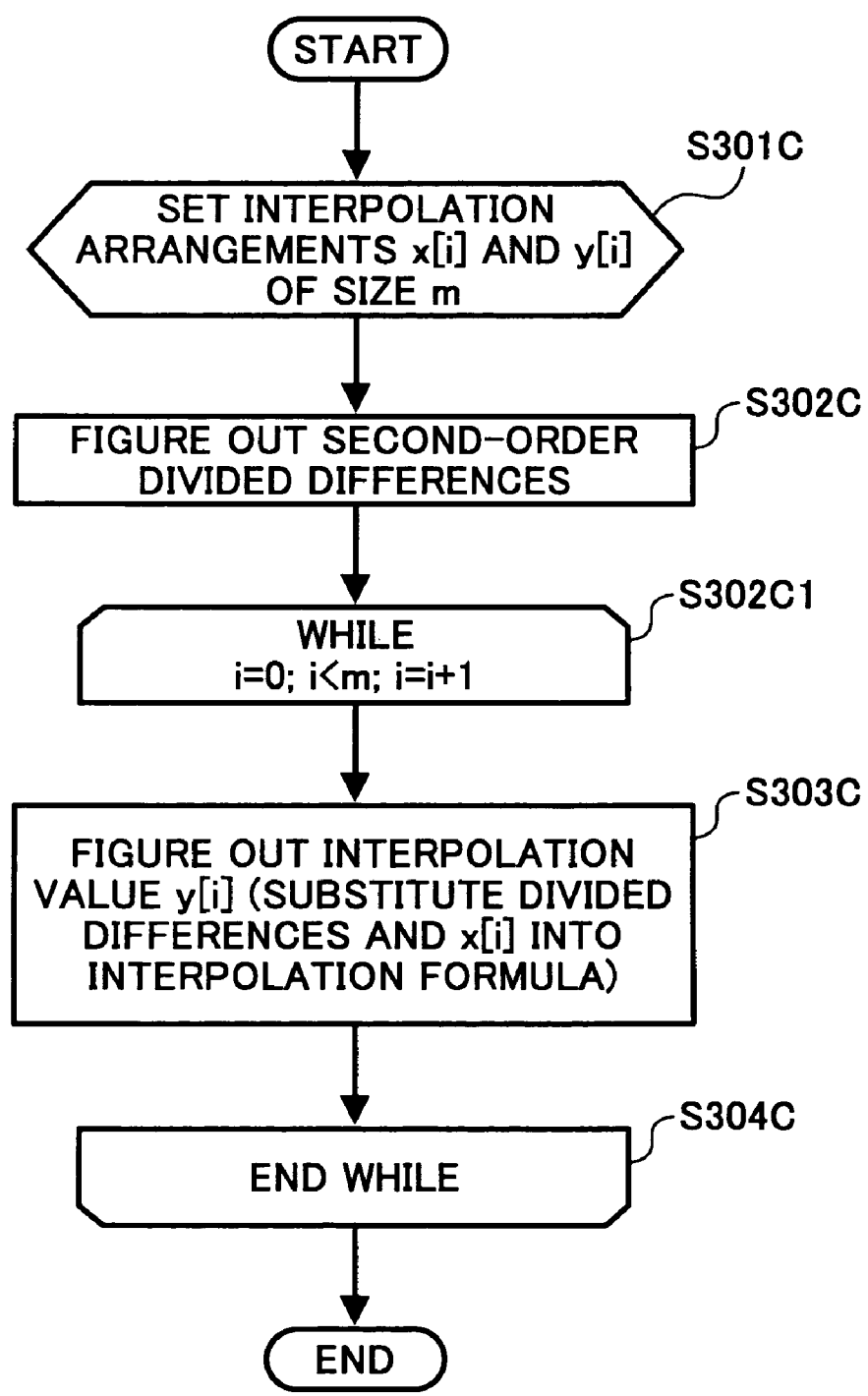

Now, sill another interpolation processing (interpolation processing 3) will be described with reference to FIG. 4(c). In this example, the situation of FIG. 2(a) will also be taken as an example, as is the case with the above-mentioned interpolation processing.

In the interpolation processing 1, the second-order differential coefficient is figured out, while in this interpolation processing 3, second-order divided differences are employed instead of this coefficient.

In the same way as the above-mentioned interpolation processing 1, the interpolation processing 3 will be explained below by taking the example in which sections C1 through C4 (range 55a) are interpolated based on lens positions x[0], x[1], x[2], x[3], x[4], and x[5] and evaluation values y[0], y[1], y[2], y[3], y[4], and y[5] in FIG. 2(a).

First, the CPU 18 defines all of lens driving positions in sections to be interpolated (S301c). Then, the CPU 18 defines one-dimensional arrangement for storing two data (x, y). (In other words, it sets interpolation arrangements x[i] and y[i] of a size m.) And it stores lens positions in the data x and interpolation values in the data y. In FIG. 6(c), as reset processing of arrangements is performed definition of the arrangements and storing processing of the lens positions in the data x.

Thereafter, the CPU 18 figures out second-order divided differences f(x[0], x[1], x[2]), f(x[1], x[2], x[3], f(x[2], x[3], x[4]), and f(x[3], x[4], x[5]), namely, M[1], M[2], M[3], and M[4] (S302C), based on the following formula [Formula No. 6]. Note that M[0]=0. [Formula No. 6]

Then, the CPU 18 figures out interpolation values of each section in the sections C1 through C4 (range 55a) (S304C). Now, interpolation within the section C2 will be described below. The CPU 18 figures out an interpolation value C[2](x) at a lens position x in the section C2 by substitution of k=2 in the above-mentioned [Formula No. 3], that is, by substitution of M[1], M[2], h[2], x[1], and x[2], thus obtaining the interpolation values in the section C2 (S303C). All lens driving positions within the section C2 are subjected to the same deriving way of interpolation values, thereby achieving interpolation of the section C2.

Thus, the interpolation processing 3 permits solving the problems in the prior art and includes the simplest steps in comparison with the above-mentioned two interpolation processing because its algorithm is based only on substituting calculation. This allows its application to a photographing apparatus having a low capacity of the SDRAM 19 as shown in FIG. 1 and to a photographing apparatus having a low calculation-processing speed of the CPU 18.

Second Preferred Embodiment of the Present Invention

FIGS. 5 to 11 show the second preferred embodiment of the present invention. In this second embodiment, the control circuit having the configuration as shown in FIG. 1 is basically utilized. Particularly, in the second embodiment, the CPU 18 executes control of auto-focus processing, as distinct from the first embodiment of the present invention.

Now, the operation of the auto-focus processing will be described with reference to a flowchart of FIG. 6.

Figure 5:
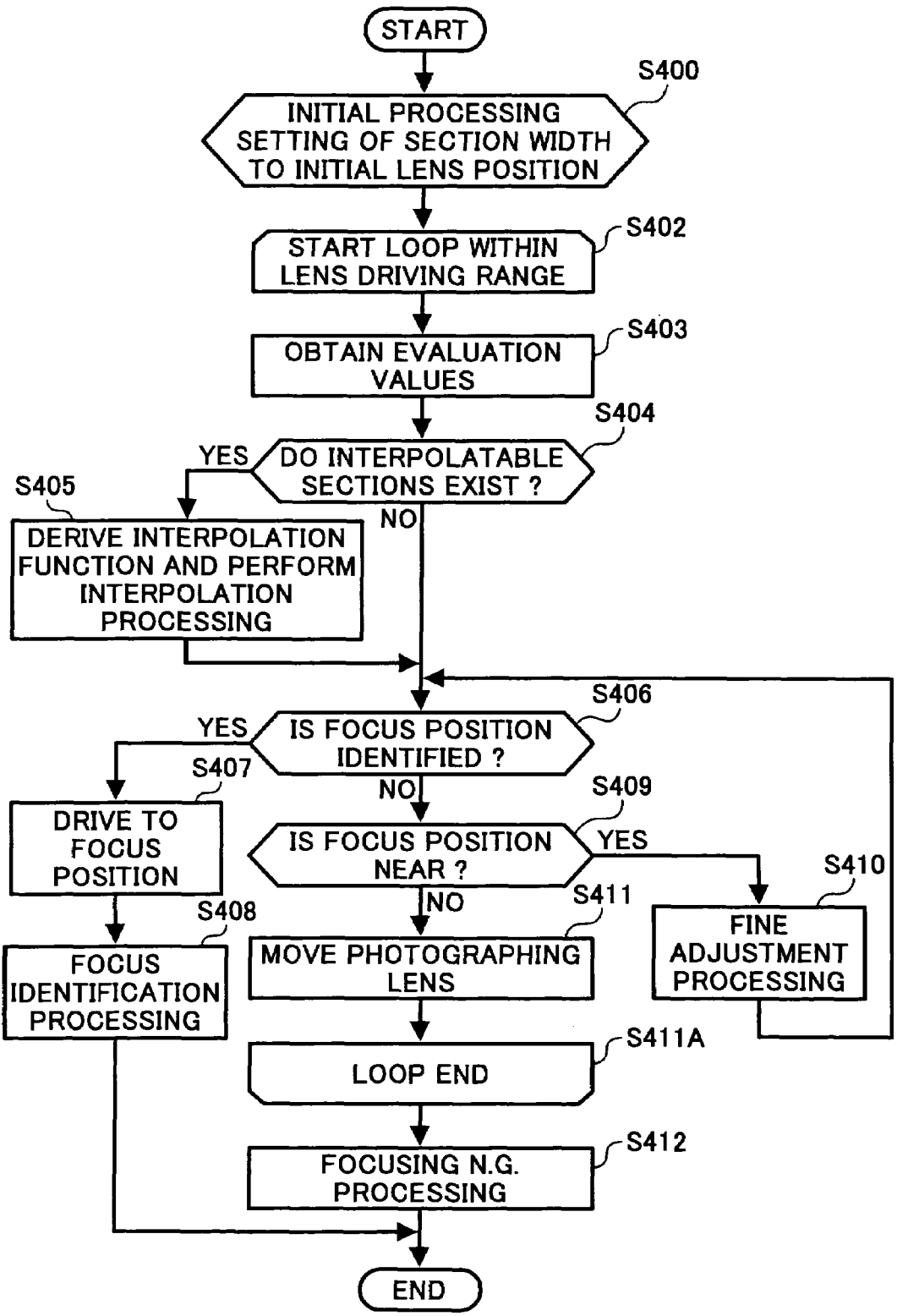
FIG. 5 is a flowchart showing auto-focus processing according to another preferred embodiment of the present invention.

An auto-focus processing system receives auto-focus signals inputted from the CPU 18 and then conducts the processing of FIG. 5.

Figure 6:
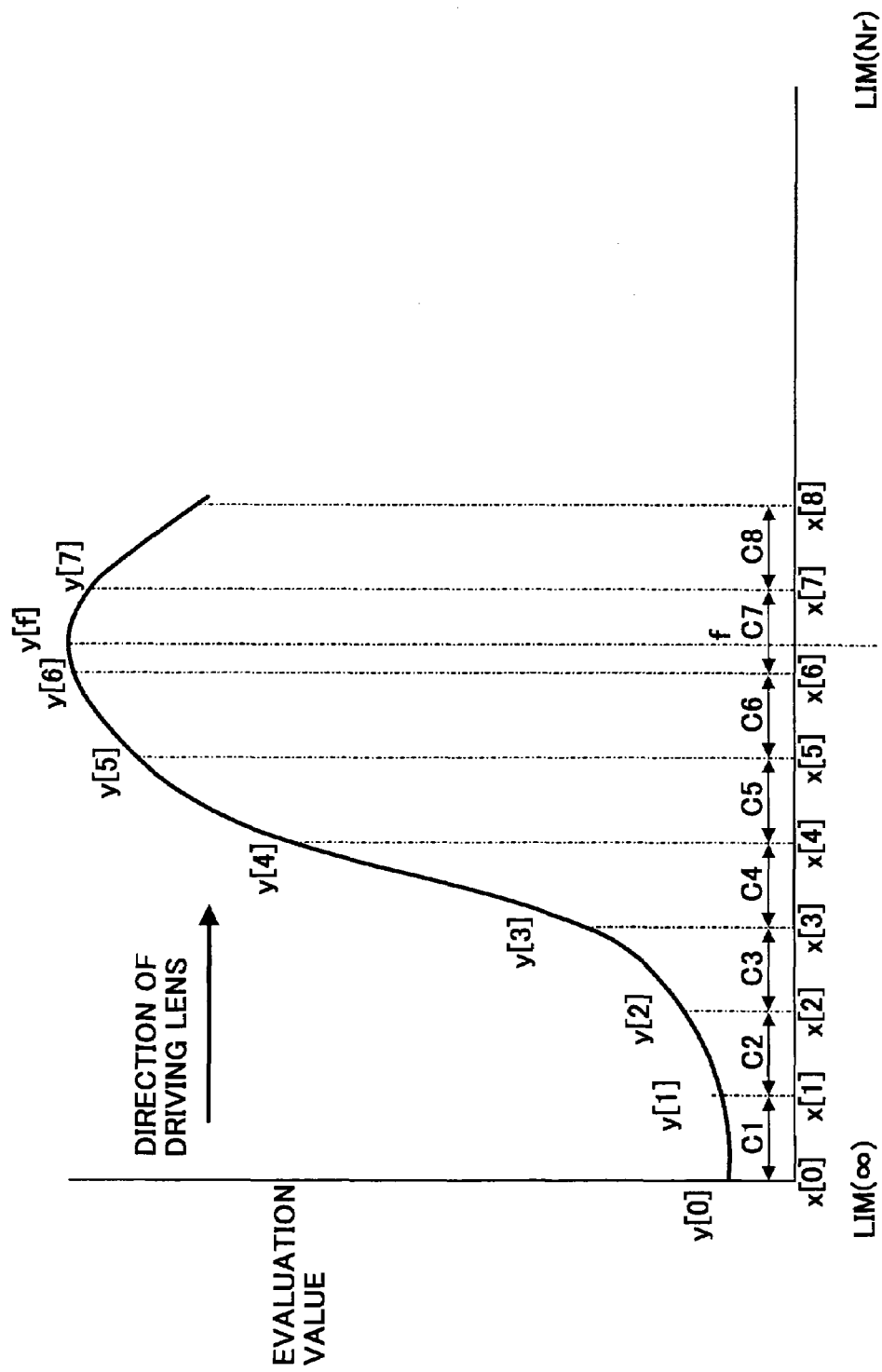
FIG. 6 is an explanatory diagram of an example in which a focus position is identified in the auto-focus processing based on the flowchart of FIG. 5.

First, the CPU 18 drivingly controls the motor 12 by means of the driver 13 to drive a present position of the lens to an initial position x[0] as shown in FIG. 6 (S400). A lens position whose focal length is at an infinite distance is set Lim (∞). Note that in the present invention, the initial position is not limited thereto.

Simultaneously, the CPU 18 determines a section width (namely, a driving distance) based on the depth of field which is determined from a focal length of the zoom lens 1a and lens brightness (S400).

Then, conditional processing of steps S402 through S411A is conducted. In the conditional processing, the CPU 18 obtains evaluation values via the IPP 5 based on image signals obtained from the CCD 3 at present timing. The obtained evaluation values are stored in the SDRAM 19 (S403).

Next, the CPU 18 determines or judges whether there are any interpolating sections (S404). When it is determined that there are any interpolating sections, the CPU 18 gives a corresponding interpolation value to each minimum driving distance for the interpolating sections (S405). When there is no interpolating section, the CPU 18 proceeds to a step S406.

The method of giving such an interpolation value is achieved by figuring out an interpolation function which sends an evaluation value back to a driving position at a boundary, and by substituting each driving position into the function. For example, the interpolation function is derived from a tertiary natural spline function. The tertiary natural spline function is at most a tertiary continuous function which smoothly passes through sample points (in an example of FIG. 6, point Y[i] obtained by plotting an evaluation value at an boundary between the sections), and has a feature in that first- and second-order differential coefficients can be figured out at an arbitrary driving position.

If there is no interpolating section in judgment of the step S404, the CPU 18 cheeks or examines a tendency of the sections already interpolated and judges whether a focus position is identified or not (S406). Then, when a focus position is capable of being identified, the CPU 18 drives the photographing lens to the focus position (S407) to conduct auto-focus identification processing, thus leading to the end of the processing (S408).

Now, a method of identifying the focus position in the step S408 will be described below in detail. First, a method of identifying a maximum of a curve is shown in an example of FIG. 6. Provided that interpolation of the sections C1 through C7 is completed, a driving position f in the section C7 has a maximum evaluation value y[f] in the example of FIG. 6. At this time, first- and second-order differential coefficients d1 and d2 of an interpolation function at a position x[7] are figured out, Intuitively, the d1 indicates a slope of the curve at the point, while the d2 indicates an increasing ratio of the slope. And an error dn caused by noise is defined. In the case of relations d1<−dn and d2<−0, the point x[f] is judged to be a focus position.

However, in the above-mentioned example, in a case where the maximum of the curve exists and the evaluation value is gently decreased, the identifying process cannot be terminated immediately. In this case, provided that the condition d1<−dn is satisfied three times in sequence at boundaries x[m], x[m+1], and x[m+2] between adjacent sections, that is, provided three sequent evaluation values are decreased after the lens position f, the same way of judgment is performed. It should be noted that in the latter case or condition, the present invention is not limited to the above-mentioned judgment condition.

If the focus position is not identified in judgment of the step S406, the CPU 18 further determines whether the focus position is near or not (S409).

Figure 7:
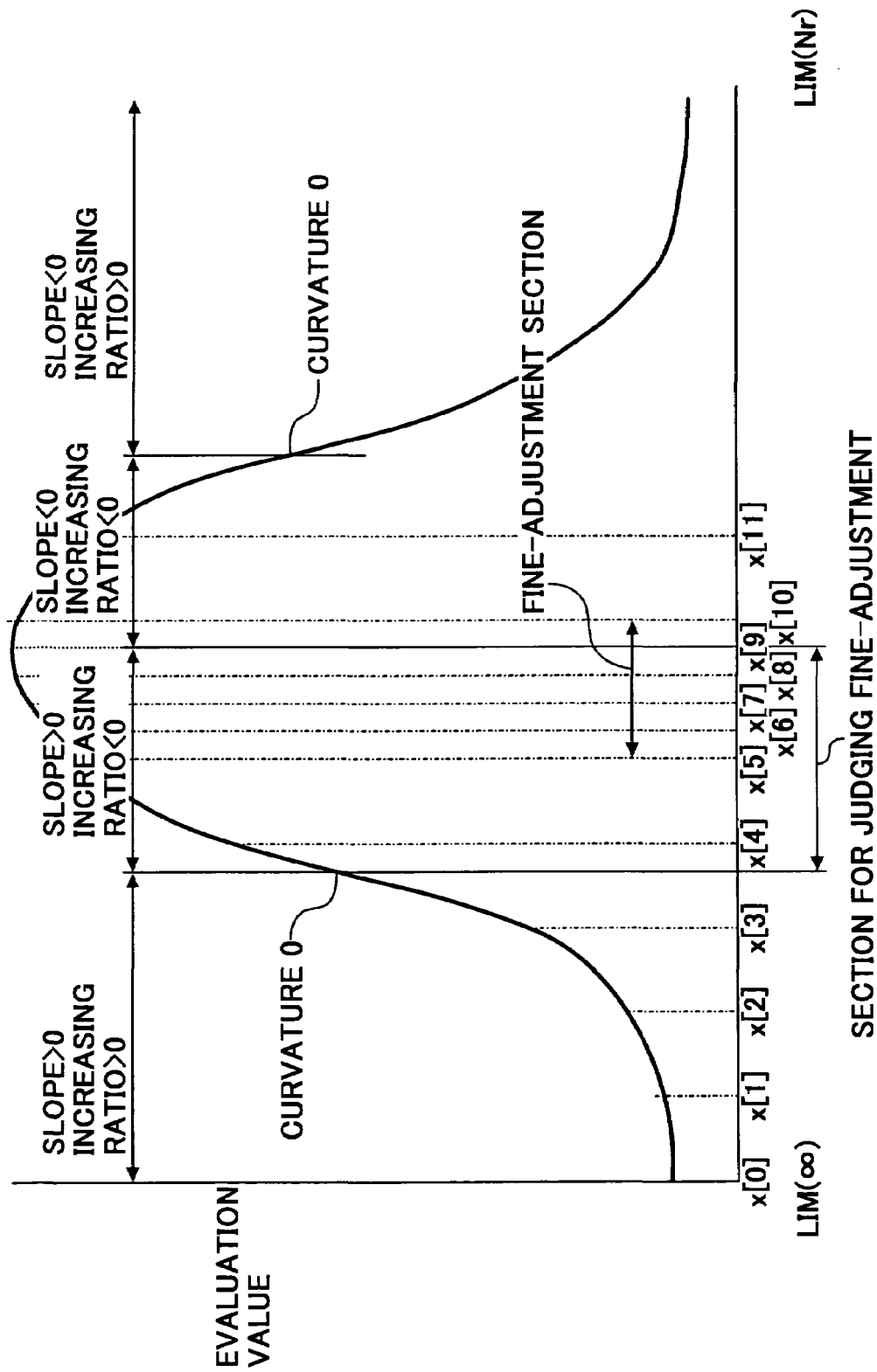
FIG. 7 is an explanatory graph of one example of fine adjustment in the auto-focus processing.

A method of determining or judging of the near focus position will be explained below with reference to an example of FIG. 7. Suppose interpolation of the sections C1 through Ck is completed. In this situation, when it is judged that the focus position is near, the CPU 18 first figures out first- and second-order differential coefficients d1 and d2 at the position x[k]. In the case of d1>dn and d2<0 utilizing the error, dn caused by noise, the CPU 18 judges that the focus position is near. In FIG. 7, in the case of k=4, it is judged that the focus position is near.

If the photographing lens 1 is supposed to be in the vicinity of the focus position in judgment of the step S406, the CPU 18 proceeds to and performs fine adjustment processing having a high degree of accuracy from a next section (S410).

In contrast, if the photographing lens 1 is not supposed to be in the vicinity of the focus position in judgment of the step S406, the CPU 18 drives the photographing lens 1 to a next driving position (S411), whereby the operation returns to the top of a loop (S403 in the conditional processing of S402 to S411A).

Figure 8:
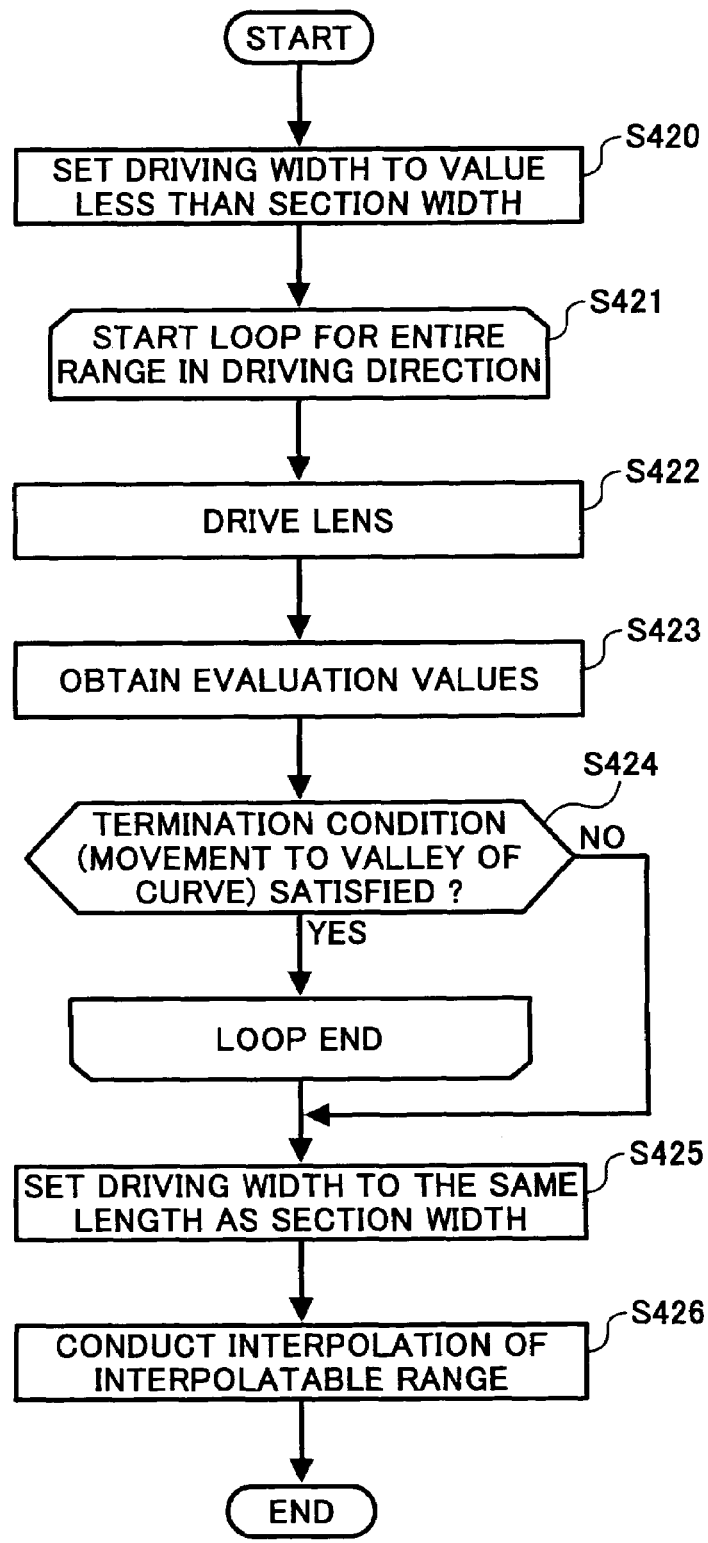
FIG. 8 is a flowchart of the fine adjustment processing.

Referring now to a flowchart of FIG. 8, the fine adjustment processing having a high degree of accuracy will be explained in detail below. The CPU 18 drives the lens not only to boundaries between the sections but also into the appropriate section (which corresponds to a fine-adjustment section as shown in FIG. 7), thereby to obtain evaluation values (S422 and S423), thus improving the accuracy of interpolation. Then, the operation proceeds to a step S424.

In the step S424, it is determined whether a termination condition of the fine adjustment (in other words, a condition in which the lens is approaching a peak or a valley of the curve) is satisfied or not.

This fine-adjustment termination condition arises when the focus position is identified, or when the fine adjustment is unnecessary as a result of judgment or determination that the focus position does not exist in the vicinity of the driving position of the photographing lens 1.

As one example of the fine-adjustment termination condition (S424) will be taken the following case: first- and second-order differential coefficients d1 and d2 at the position x[k], which is an end of an interpolated range, are figured out in FIG. 7, and either of a relation d1<−dn and a relation d2>0 is satisfied by the use of a noise error dn.

In the case of FIG. 7, at k=10, the fine-adjustment termination condition is satisfied, whereby the CPU 18 terminates further fine adjustment from a next stage (S425 and S426).

Flowcharts of FIG. 9 and FIG. 10 (preparation processing) and a flow chart of FIG. 11 (main processing) show an example in which processing of alternating an initial position is additionally performed by obtaining evaluation values of vicinal positions x[1], x[2], x[3], and x[4] in a driving direction, when driving the photographing lens 1 to the initial position in starting the auto-focus processing. In other words, the flowchart of the main processing as shown in FIG. 11 has a sub-routine of the preparation processing of FIG. 10 arranged between the steps S400 and S402 in the flowchart of FIG. 5, and has the same steps as those in the flowchart of FIG. 5 except for this preparation processing.

In this preparation processing, especially in conditional processing of steps S430 through S432A, the CPU 18 repeatedly performs predetermined times, processing of a step S431 for driving the photographing lens 1 in a predetermined direction by a prescribed width and processing of a step S432 for obtaining evaluation values. Then the operation proceeds to a step S433. In this step S433, the CPU 18 conducts interpolation processing of scan sections or driving sections based on the evaluation values obtained from the conditional processing of the steps S430 through S432A, thus leading to a step S434. In the step S434, the CPU 18 determines whether a direction of the focus position of the photographing lens 1 is identified with respect to the present position of the photographing lens 1. When the focus-position direction of the photographing lens 1 is identified in judgment, the CPU 18 proceeds to a step S435. In contrast, when the focus-position direction of the photographing lens 1 is not identified, the CPU 18 proceeds to a step S436. In the step S435, the CPU 18 moves the photographing lens 1 to the present lens position and sets the driving direction on the focus position side, thus terminating the preparation processing. Thereafter the operation proceeds to a step S402 of FIG. 11. In the step S436, the CPU 18 sets an initial position and a driving direction of the photographing lens 1 to predetermined ones, thereby terminating the processing. Then the operation proceeds to the step S402 of FIG. 11.

After such preparation processing, the CPU 18 conducts the conditional processing of the steps S402 through S411A.

For example, in the example of FIG. 9(a), a focal-length infinity Lim ($\infty$) is provided on a left side as a position of the photographing lens 1, while a focal-length closest point Lim (Nr) is provided on a right side. The driving direction of the photographing lens 1 is one from the focal-length closest point Lim (Nr) side to the focal-length infinity Lim ($\infty$) side. As a lens position P[i](i=0, 1, 2, 3 . . . ) of the photographing lens 1 is moved towards the focal-length infinity Lim($\infty$), a value i increases in the order of, for example, P[0], P[1], P[2], and P[3]. As the lens position P[i] is moved towards the focal length infinity Lim($\infty$), an evaluation value Q[i](i=0, 1, 2, 3 . . . ) of the photographing lens position P[i] decreases in the order of, for example, Q[0], Q[1], Q[2], and Q[3], resulting in a leftward declining curve.

Accordingly, in the example of FIG. 9(a), the CPU 18 can anticipate by means of judgment method based on the differential coefficients that a focus position exists in a reversed direction of the driving direction with respect to a present position of the photographing lens. In this case, the CPU 18 sets the present position of the photographing lens as an initial position and performs auto-focus processing (steps S402 to S412 in FIG. 11) in a direction of the focus existence position side. For example, when the photographing lens 1 is located at the lens position P[1] of FIG. 9 (a), the CPU 18 sets the lens position P[1] as the initial position. And the CPU 18 drivingly controls the photographing lens 1 in a reversed direction of the direction from the lens position P[1] to the focal-length infinity Lim($\infty$), that is, in the direction of the focal-length closest position Lim(Nr) on the focus existence position aide to execute the auto-focus processing.

Figure 9B:
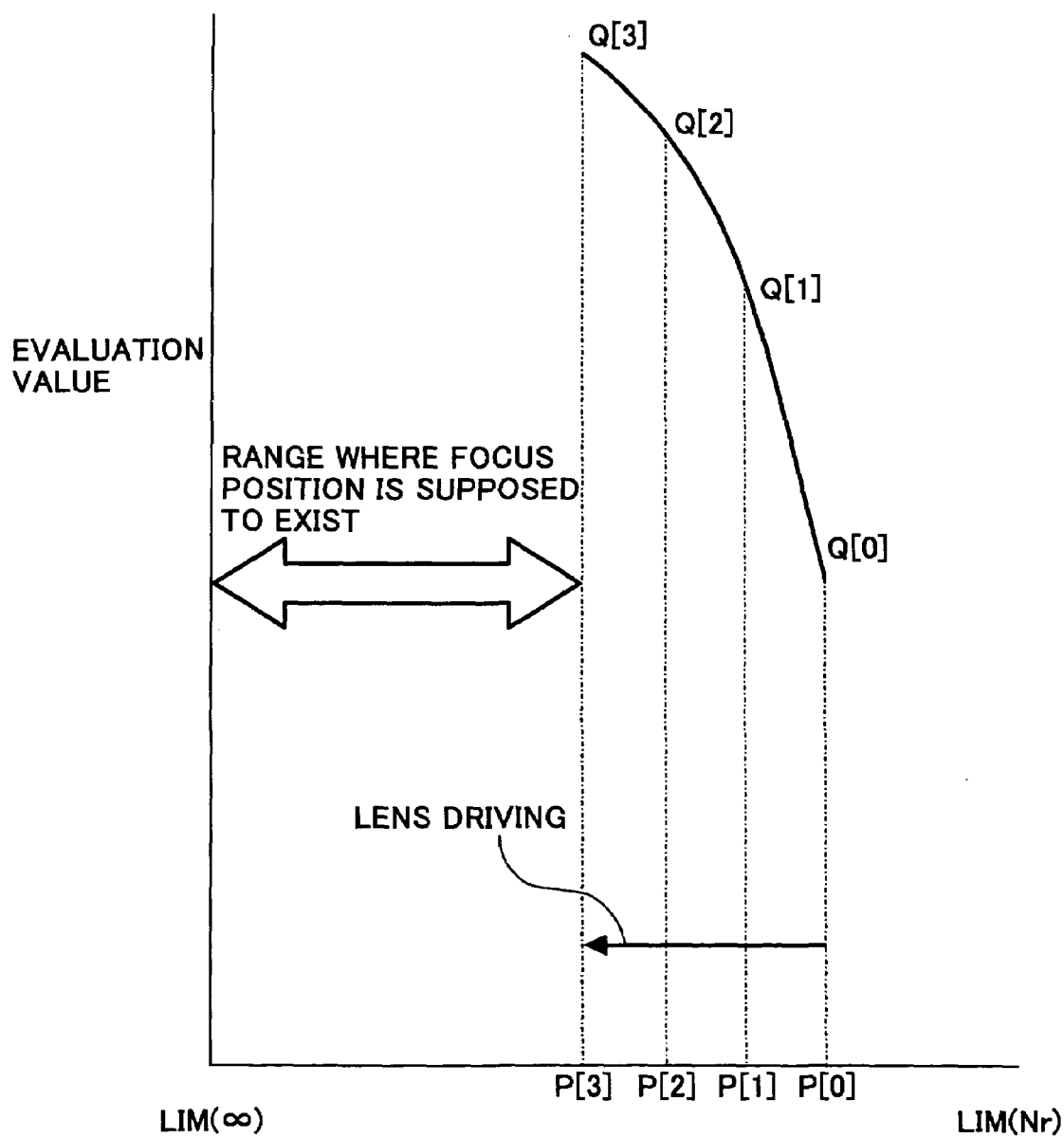

Concretely, in the example of FIG. 9(b), a focal-length infinity Lim ($\infty$) is provided on a left side as a position of the photographing lens 1, while a focal-length closest point Lim (Nr) is provided on a right side. The driving direction of the photographing lens 1 is one from the focal-length closest point Lim (Nr) side to the focal-length infinity Lim ($\infty$) side. As a lens position P[i](i=0, 1, 2, 3 . . . ) of the photographing lens 1 is moved towards the focal-length infinity Lim($\infty$), a value i increases in the order of, for example, P[0], P[1], P[2], and P[3]. As the lens position P[i] is moved towards the focal-length infinity Lim($\infty$), an evaluation value Q[i](i=0, 1, 2, 3 . . . ) of the photographing lens position P[i] decreases in the order of, for example, Q[0], Q[1], Q[2], and Q[3], resulting in a leftward increasing curve.

Accordingly, in the example of FIG. 9(b), the CPU 18 can anticipate by means of judgment method based on the differential coefficients that a focus position exists in the same direction as the driving direction with respect to a present position of the photographing lens. In this case, the CPU 18 sets the present position of the photographing lens as an initial position and performs auto-focus processing (steps S402 through S412 in FIG. 11) in a direction of the focus existence position side. For example, when the photographing lens 1 is located at the lens position P[1] of FIG. 9(b), the CPU 18 sets the lens position P[1] as the initial position. And the CPU 18 drivingly controls the photographing lens 1 in the direction from the lens position P[1] to the focal-length infinity Lim($\infty$) to execute the auto-focus processing.

Figure 12B:
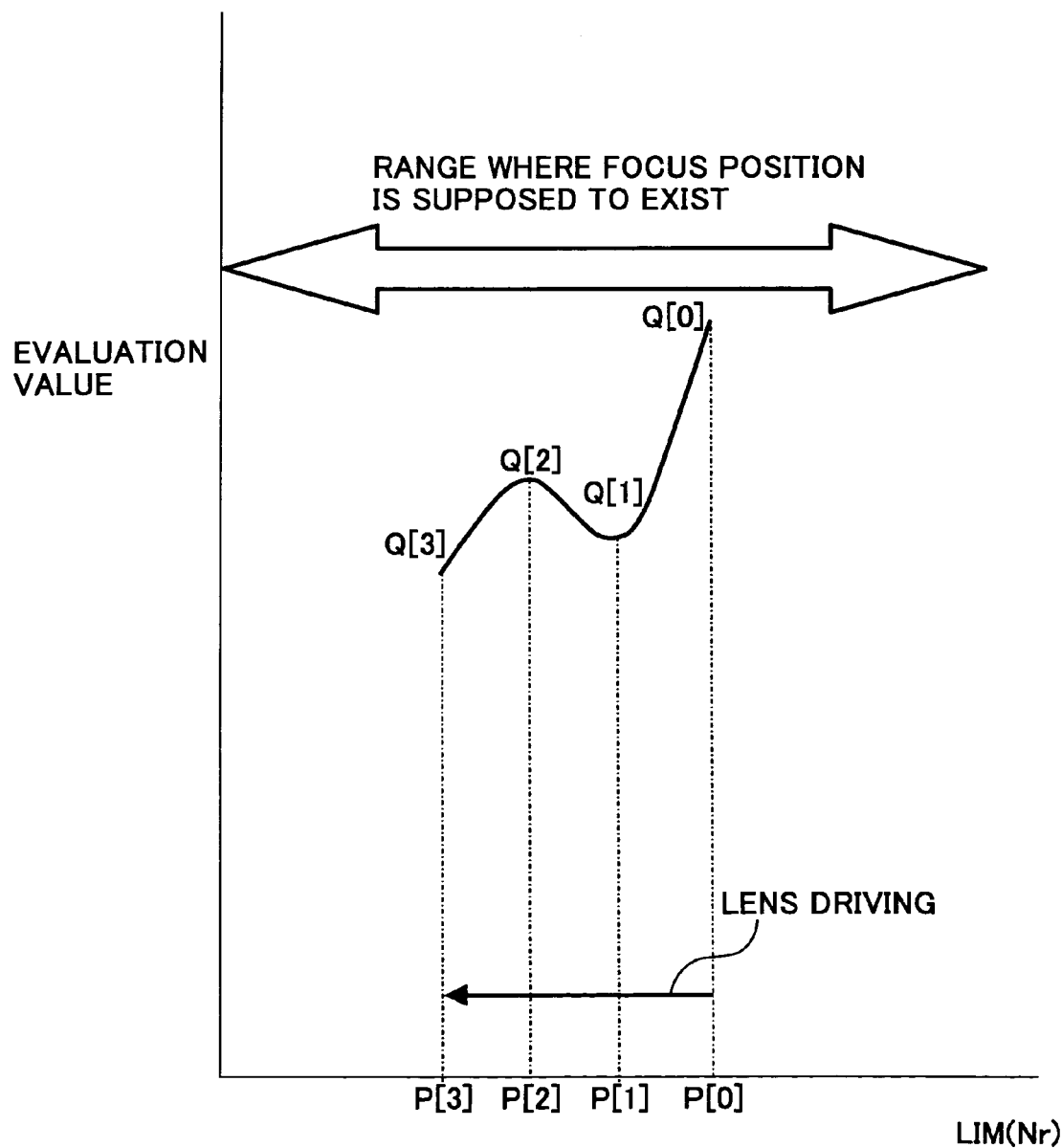

However, in an example of FIG. 12(a), changes in evaluation values Q[0], Q[1], Q[2], and Q[3] are so small with respect to lens positions P[0], P[1], P[2], and P[3] that the existence direction of the focus position cannot be specified. In an example of FIG. 12(b), a curve connecting evaluation values Q[0], Q[1], Q[2], and Q[3] has two inflection points at the evaluation values Q[1] and Q[2], resulting in that the existence direction of the focus position cannot be specified. Thus, in cases where the existence direction of the focus position cannot be specified, the CPU 18 sets the initial position as the prescribed position Lim($\infty$) to execute the auto-focus processing (S402 through S412 in FIG. 11).

As can be seen from the above description, the photographing apparatus of the preferred embodiment according to the present invention comprises: the photographing lens 1 capable of moving a focal plane of a subject image; the photographing device (CCD 3) for receiving the subject image and outputting a signal into which the subject image is photo-electrically transferred, as image output; the driving means (motor section 12) for driving the photographing lens 1; and the control means (CPU 18) for operating and controlling the driving means (motor 12), serving as a calculation control circuit (calculation control means). Further, this control means (CPU 18) divides a range for enabling driving of the photographing lens into a minimum number of or more sections which are capable of being interpolated, drives the photographing lens 1 to each divided section in sequence, figures out a focus signal based on a photographing signal obtained from the photographing device at the each driving position, and performs interpolation processing of an evaluation value obtained from the focus signal. By this interpolation processing, the control means (CPU 18) derives a focus position of the photographing lens 1 which position causes the focal plane to coincide with the photographing plane. The control means (CPU 18) drivingly controls the driving means (motor 12) to drive the photographing lens to the derived focus position.

This configuration ensures improved interpolation accuracy and an excellent balance of focus-position accuracy in an entire driving range of the photographing lens and time needed for obtaining a focus position. That is, by deriving an interpolation function based on sample positions of the photographing lens and evaluation values thereof, the focus position can be effectively derived without being influenced by a focal length of the lens and F number thereof This can provide the photographing apparatus that offers the excellent balance of the focus-position accuracy in the entire driving range and the time required for obtaining the focus position. The number of divided sections in a drivable range is not less than a minimum number which enables forming of the interpolation function, thereby allowing at least interpolation processing.

The control means (CPU 18) which serves as a calculation control circuit (calculation control means) of the photographing apparatus in the preferred embodiment figures out an auto-focus evaluation value based on the photographing signal obtained from the photographing device (CCD 3) at each driving position, derives an interpolation function from data on the each driving position and the auto-focus evaluation value, and performs the interpolation processing of the section based on the interpolation function, thereby figuring out the focus position of the photographing lens for causing the focal plane to coincide with the photographing plane of the photographing device (CCD 3).

With this configuration, by deriving an interpolation function based on sample positions of the photographing lens and auto-focus evaluation values thereof, the focus position can be effectively derived without being influenced by a focal length of the lens and F number thereof. This can provide the photographing apparatus that offers an excellent balance of the focus-position accuracy In the entire driving range and the time required for obtaining the focus position.

The control means (CPU 18) of the photographing apparatus in the preferred embodiment figures out an auto-focus evaluation value based on the photographing signal obtained from the photographing device at each driving position, figures out an interpolation function from data on the each driving position and the auto-focus evaluation value, and performs the interpolation processing of the section based on the interpolation function. By this interpolation processing, the control means (CPU 18) FIGS. out the focus position of the photographing lens for causing the focal plane to coincide with the photographing plane of the photographing device, and drivingly controls the driving means (motor 12) to drive the photographing lens to the focus position. This configuration permits effectively calculating the focus position by deriving the interpolation function without being influenced by the focal length of the photographing lens and F number thereof.

In the photographing apparatus of the preferred embodiment, the data on the auto-focus evaluation value is generated through a frequency filter. In a case where the data on a plurality of the auto-focus evaluation values is generated by using a plurality of the frequency filters, some or all of the data on the auto-focus evaluation values generated is subjected to the interpolation processing, thereby figuring out the focus position.

With this configuration, for example, since a high frequency component allows interpolation with high focus-position accuracy, while a low frequency component allows interpolation of wider sections compared to the high frequency component, frequency filters are used to perform division of components. Either or both of components can be used for interpolation processing in accordance with an object such as interpolation.

In the photographing apparatus of the preferred embodiment, the interpolation processing is conducted by use of a spline function. In this configuration, when a plot is shown with a horizontal axis indicating data on lens positions, each of which is based on the reciprocal of a focal length, and with a vertical axis indicating data on evaluation values, the spline function for interpolation of these data has characteristics of passing through data points and of continuing between the sections. Accordingly, the spline function exhibits a smooth curve.

In the photographing apparatus of the preferred embodiment, the spline function is a natural spline function. A n-th order natural spline function is only a n-th function that permits connection of the data points most smoothly. With this configuration, the interpolation is performed by using such a function, thereby making satisfactory approximations of a number of functions which appear in optical phenomena. (Note that n is a plus odd number.)

In the photographing apparatus of the preferred embodiment, the spline function is established by figuring out a differential coefficient. This permits figuring out an interpolation function by solving a differential equation or by substituting a differential coefficient into a predetermined formula.

In the photographing apparatus of the preferred embodiment, the spline function is derived as, at most, a tertiary function formula by figuring out a second-order differential coefficient. In this configuration, a matrix that indicates the equation is a diagonal matrix with three columns. This enables figuring out calculation time in proportion to data points and obtaining an interpolation function only by substituting calculation.

In the photographing apparatus of the preferred embodiment, when performing the interpolation processing, Newton's divided differences interpolation formula of an order of the number of sections or less is utilized for the interpolation processing at each section. In cases where interpolation that passes through data point, conducted on the basis of a high-order curve, is necessary, this configuration can obtain an interpolation function in a shorter time than that required in the interpolation conducted by the natural spline function. Further, this allows figuring out an interpolation function of an arbitrary order that is less than the number of the data points. When another data point is added, the interpolation function can be updated without wasting past calculation results, thus enabling effective calculation.

In the photographing apparatus of the preferred embodiment, when performing the interpolation processing, a divided difference at a boundary between the sections is figured out for the interpolation processing at each section, and then the divided difference is substituted into a predetermined formula, thereby obtaining an interpolation value. With this configuration, divided differences having the order of n–1 or less are figured out for n data points, and these differences are substituted into the predetermined formula. Further, m-th order divided differences have a similar tendency to that of a m-th order differential coefficient. By the use of this tendency, the focus position is available in a short calculation time.

In the photographing apparatus of the preferred embodiment, the predetermined formula is, at most, a tertiary function to an unknown, and the divided difference to be substituted is excluded from a constant term. With this configuration, an interpolation function of a section [P(k–1), P(k)] within a range of n data series P(i)[i=0, 1, 2, . . . , n] is figured out by substitution into the predetermined formula utilizing second-order divided differences f[P(k–2), P(k–1), P(k)] and f[P(k–1), P(k), P(k+1)]. Accordingly, the derived interpolation function obtained by using the above-mentioned differential coefficients has a similar tendency to that of a curve, thereby figuring out a focus position in a short calculation time.

In the photographing apparatus of the preferred embodiment, first the interpolation processing derives an interpolation function for an interpolating section, and then the interpolation function is used for all driving positions of the photographing lens in the section, thereby deriving an evaluation value in a dummy manner. In this configuration, the derivation of the interpolation function permits effective derivation of the focus position without being influenced by a lens focal length and F number thereof. Further, the number of driving the actual lens is reduced, thereby to achieve speedup in a focusing-operation.

In the photographing apparatus of the preferred embodiment, if there are any sections capable of being interpolated, obtaining processing of the evaluation value is conducted in parallel with the interpolation processing. In this configuration, the interpolation processing as genuine software processing and the driving processing of the photographing lens as mechanical processing are simultaneously performed, thereby conducting focus processing at higher speed than when both processing are performed in sequence.

In the photographing apparatus of the preferred embodiment, as a result of the interpolation processing, when the focus position having a maximum evaluation value is identified, the obtaining processing of the evaluation value and the interpolation processing of the yet-to-be interpolated section are stopped, and then the photographing lens is driven to the section including the focus position. This permits omitting unnecessary driving of the lens, thereby to achieve speedup in focus processing.

In the photographing apparatus of the preferred embodiment, as the result of the interpolation processing, when the focus position turns out to be near, the control means is shifted to fine adjustment. This can improve accuracy of a focus position that is derived from interpolation function calculation without loss of focus processing time.

Further, in the photographing apparatus of the preferred embodiment, the above-mentioned fine adjustment moves the photographing lens such that a driving distance of the photographing lens is below a section width, but a minimum driving distance or more, thereby obtaining the evaluation value. This can improve the focus-position accuracy derived from the interpolation function calculation without loss of focus processing time, and facilitate control itself, resulting in less load onto calculation processing.

When a focus position is anticipated by differential coefficients of the interpolation function in a quantitative manner and then the photographing lens approaches the anticipated focus position, the control means is shifted to fine adjustment. In this case, since a tendency of interpolation function in a just next section can be anticipated, the control means can proceed to the fine adjustment at substantially appropriate timing, thereby achieving reduction in time for focus processing and improving focus-position accuracy.

Before driving the photographing lens to an initial position, an evaluation value of a section in the vicinity of a present driving position of the photographing lens is obtained. If a focus position is judged to be in the vicinity, auto-focus processing can be conducted in a direction towards the focus existence position which is to be anticipated from the present lens driving position. In this case, when the position of the photographing lens is in the vicinity of the focus position, it is possible to derive the focus position in a shorter time.

With this construction, in cases where differential coefficients of the interpolation function are used when the focus position is judged to be in the vicinity, if a change in the coefficient is large within the section, it can be determined immediately in which direction the focus position is located with respect to the present position of the photographing lens, thereby figuring out the focus position in a shorter time.

What is claimed is:

1. A photographing apparatus comprising:
a photographing lens for photographing a subject image;
a photographing device for receiving said subject image and outputting a photographing signal into which the subject image is photo-electrically transferred;
a driving device for driving said photographing lens; and
a control device for controlling said driving device, wherein said control device
divides a driving range of said photographing lens into sections,
drives said photographing lens to boundaries between said divided sections in sequence by said driving device,
figures out an evaluation value based on said photographing signal obtained from said photographing device at said each boundary,
derives an interpolation function from said evaluation values at said boundaries,
derives interpolation values at all driving positions of said photographing lens within said each section based on said interpolation function, and
judges whether a focus position exists or not based on said evaluation values and said interpolation values, wherein
if said focus position is identified, said control device executes judgment of focus to drive said photographing lens to said focus position, and
if said focus position is not identified, said control device judges whether said focus position is near or not to be shifted for performing fine adjustment when said focus position turns out to be near.

2. The photographing apparatus as claimed in claim 1, wherein said control device figures out the focus position of the photographing lens for causing a focal plane to coincide with a photographing plane of said photographing device.

3. The photographing apparatus as claimed in claim 2, wherein the data on said evaluation value is generated through a frequency filter, and wherein, in a case where the data on said evaluation value is generated by using a plurality of the frequency filters, some or all of the data on the evaluation value generated is subjected to the interpolation processing, thereby figuring out the focus position.

4. The photographing apparatus as claimed in claim 1, wherein said interpolation processing is one conducted by use of a spline function.

5. The photographing apparatus as claimed in claim 4, wherein said spline function is a natural spline function.

6. The photographing apparatus as claimed in claim 4, wherein said spline function is established by figuring out a differential coefficient.

7. The photographing apparatus as claimed in claim 4, wherein said spline function is derived as, at most, a tertiary function formula by figuring out a second-order differential coefficient.

8. The photographing apparatus as claimed in claim 1, wherein, in said interpolation processing, Newton's divided differences interpolation formula of an order of the number of sections or less is used for the interpolation processing at said each section.

9. The photographing apparatus as claimed in claim 1, wherein, in said interpolation processing, a divided difference at said boundary between the sections is figured out for the interpolation processing at said each section, and then the divided difference is substituted into a predetermined formula, thereby obtaining the interpolation value.

10. The photographing apparatus as claimed in claim 9, wherein said predetermined formula is, at most, a tertiary function to an unknown, and said divided difference to be substituted is excluded from a constant term.

11. The photographing apparatus as claimed in claim 1, wherein, if there are any sections capable of being interpolated, obtaining processing of said evaluation value is conducted in parallel with said interpolation processing.

12. The photographing apparatus as claimed in claim 11, wherein, as a result of said interpolation processing, when the focus position having a maximum evaluation value is identified, the obtaining processing of the evaluation value and the interpolation processing of the yet-to-be interpolated section are stopped, and then said photographing lens is driven to the section including the focus position.

13. The photographing apparatus as claimed in claim 1, wherein, in said fine adjustment, the photographing lens is driven such that a driving distance of said photographing lens is below a section width, but a minimum driving distance or more, thereby obtaining said interpolation value.

14. The photographing apparatus as claimed in claim 1, wherein,
said control device determines said focus position such that said focus position is judged as a point in which both of the following equations are satisfied $$d1 < -dn$$

$$d2 < 0$$

where a first-order differential coefficient d1 indicates a slope of a curve, a second-order differential coefficient d2 indicates an increasing ratio of said slope of said interpolation function at said point, and dn is a predetermined value.

15. The photographing apparatus as claimed in claim 1, wherein,
said control device judges that said focus position is near a position in which both of the following equations are satisfied $$d1 > dn$$

$$d2 < 0$$

where a first-order differential coefficient d1 indicates a slope of a curve, a second-order differential coefficient d2 indicates an increasing ratio of said slope of said interpolation function at said point, and dn is a predetermined value.

* * * * *